(12) United States Patent
Raats et al.

(10) Patent No.: US 9,698,625 B2
(45) Date of Patent: Jul. 4, 2017

(54) POWER GENERATION SYSTEM WITH ANTICIPATORY OPERATION

(71) Applicant: Kohler Co., Kohler, WI (US)

(72) Inventors: Joseph Petrus Eduardus Raats, Zevenbergen (NL); Anthony J. Hackbarth, Sheboygan, WI (US); Isaac S. Frampton, Strattanville, PA (US)

(73) Assignee: Kohler Co., Kohler, WI (US)

( * ) Notice: Subject to any disclaimer, the term of this patent is extended or adjusted under 35 U.S.C. 154(b) by 636 days.

(21) Appl. No.: 14/186,358

(22) Filed: Feb. 21, 2014

(65) Prior Publication Data

US 2014/0210256 A1 Jul. 31, 2014

Related U.S. Application Data

(63) Continuation-in-part of application No. 13/540,118, filed on Jul. 2, 2012, now Pat. No. 9,197,098.

(51) Int. Cl.
| | |
|---|---|
| *H02J 3/00* | (2006.01) |
| *H02J 9/06* | (2006.01) |
| *H02J 9/00* | (2006.01) |
| *H02J 9/08* | (2006.01) |

(52) U.S. Cl.
CPC ...... *H02J 9/06* (2013.01); *H02J 9/00* (2013.01); *H02J 9/08* (2013.01); *H02J 2003/003* (2013.01); *H02J 2009/068* (2013.01); *Y10T 307/696* (2015.04); *Y10T 307/826* (2015.04)

(58) Field of Classification Search
CPC .... B60R 16/03; H02J 4/00; H02J 9/00; G06F 17/5009; G06F 19/00; G06F 1/3287; G06Q 20/3278; G06Q 10/083; G06Q 10/0838; G05B 15/02

USPC ............ 307/9.1; 340/10.1; 345/156; 703/18; 705/44; 713/300
See application file for complete search history.

(56) References Cited

U.S. PATENT DOCUMENTS

| | | | |
|---|---|---|---|
| 2,546,410 | A | 3/1951 | Schwendner et al. |
| 2,832,896 | A | 4/1958 | Stineman et al. |
| 3,300,647 | A | 1/1967 | Gogia et al. |
| 3,489,914 | A | 1/1970 | Taylor |
| 4,233,555 | A | 11/1980 | Roche |
| 4,302,683 | A | 11/1981 | Burton |
| 4,384,213 | A | 5/1983 | Bogel |

(Continued)

FOREIGN PATENT DOCUMENTS

| | | |
|---|---|---|
| CN | 101871396 A | 10/2010 |
| CN | 201781325 A | 3/2011 |

(Continued)

OTHER PUBLICATIONS

"U.S. Appl. No. 13/540,118, Corrected Notice of Allowance mailed Aug. 31, 2015", 2 pgs.

(Continued)

*Primary Examiner* — Thienvu Tran
*Assistant Examiner* — David M Stables
(74) *Attorney, Agent, or Firm* — Schwegman Lundberg & Woessner, P.A.

(57) ABSTRACT

Systems and methods include operating a power system in a first state, and detecting an anticipated load increase. The systems and methods further include changing operation of the power system from the first state to a second state upon detection of the anticipated load increase.

19 Claims, 19 Drawing Sheets

(56) References Cited

U.S. PATENT DOCUMENTS

| | | | |
|---|---|---|---|
| 4,405,892 | A | 9/1983 | Staerzl |
| 4,469,071 | A | 9/1984 | Bassi et al. |
| 4,625,123 | A | 11/1986 | Gillett et al. |
| 4,899,706 | A | 2/1990 | Sasaki |
| 5,252,905 | A | 10/1993 | Wills et al. |
| 5,256,959 | A | 10/1993 | Nagano et al. |
| 5,332,927 | A | 7/1994 | Paul et al. |
| 5,625,276 | A | 4/1997 | Scott et al. |
| 5,635,768 | A | 6/1997 | Birch et al. |
| 5,694,027 | A | 12/1997 | Satake et al. |
| 5,703,410 | A | 12/1997 | Maekawa |
| 5,730,098 | A | 3/1998 | Sasak et al. |
| 5,886,890 | A | 3/1999 | Ishida et al. |
| 6,191,500 | B1 | 2/2001 | Toy |
| 6,313,544 | B1 | 11/2001 | Mongia et al. |
| 6,605,878 | B1 | 8/2003 | Arce |
| 6,657,416 | B2 | 12/2003 | Kern et al. |
| 6,844,706 | B2 | 1/2005 | Pinkerton, III et al. |
| 6,894,403 | B2 | 5/2005 | Shinogi |
| 6,923,168 | B2 | 8/2005 | Bryde |
| 7,180,210 | B1 | 2/2007 | Jorgenson et al. |
| 8,049,348 | B2 | 11/2011 | Czajkowski |
| 8,766,479 | B2 | 7/2014 | Dorn et al. |
| 9,197,098 | B2 | 11/2015 | Frampton et al. |
| 9,368,972 | B2 | 6/2016 | Frampton |
| 2003/0014200 | A1 | 1/2003 | Jonker et al. |
| 2004/0059542 | A1 | 3/2004 | Apostolides |
| 2004/0164618 | A1 | 8/2004 | Bryde |
| 2005/0184589 | A1 | 8/2005 | Fujita |
| 2006/0244327 | A1 | 11/2006 | Kundel |
| 2007/0262661 | A1 | 11/2007 | Ai |
| 2009/0082957 | A1* | 3/2009 | Agassi ............ B60L 3/12 701/532 |
| 2009/0108778 | A1* | 4/2009 | Lantz ............ B60L 11/02 318/105 |
| 2009/0164806 | A1 | 6/2009 | Dishman et al. |
| 2010/0102637 | A1 | 4/2010 | Dozier et al. |
| 2010/0207454 | A1 | 8/2010 | Jagota et al. |
| 2010/0269776 | A1 | 10/2010 | Mizuno |
| 2011/0149624 | A1 | 6/2011 | Yamanaka |
| 2011/0272952 | A1 | 11/2011 | Richardson et al. |
| 2011/0291411 | A1 | 12/2011 | Folken |
| 2012/0007431 | A1 | 1/2012 | Jang et al. |
| 2012/0049638 | A1 | 3/2012 | Dorn et al. |
| 2012/0242451 | A1 | 9/2012 | Tanaka et al. |
| 2013/0103378 | A1* | 4/2013 | Tinnakornsrisuphap ............ G06F 17/5009 703/18 |
| 2014/0001769 | A1 | 1/2014 | Frampton et al. |
| 2014/0001868 | A1 | 1/2014 | Frampton et al. |
| 2014/0002032 | A1 | 1/2014 | Frampton et al. |
| 2014/0028102 | A1 | 1/2014 | Frampton |
| 2015/0115745 | A1 | 4/2015 | Wang et al. |

FOREIGN PATENT DOCUMENTS

| | | |
|---|---|---|
| CN | 103580265 A | 2/2014 |
| EP | 1006641 A2 | 6/2000 |
| WO | WO-2008130968 A1 | 10/2008 |
| WO | WO-2012/154451 A2 | 11/2012 |

OTHER PUBLICATIONS

"U.S. Appl. No. 13/540,118, Notice of Allowability mailed Aug. 20, 2015", 2 pgs.
"U.S. Appl. No. 13/559,643, Final Office Action mailed Aug. 27, 2015", 15 pgs.
"U.S. Appl. No. 13/559,643, Notice of Allowance mailed Mar. 25, 2016", 9 pgs.
"U.S. Appl. No. 13/559,643, Notice of Allowance mailed Dec. 14, 2015", 11 pgs.
"U.S. Appl. No. 13/559,643, Response filed Nov. 20, 2015 to Final Office Action mailed Aug. 27, 2015", 8 pgs.
"Chinese Application Serial No. 201310261973.8, Third Office Action mailed May 19, 2016", w/ English Translation, 8 pgs.
"Chinese Application Serial No. 201310311755.9, Office Action mailed Aug. 21, 2015", (w/ English Translation), 11 pgs.
"U.S. Appl. No. 13/540,118, Examiner Interview Summary mailed Jun. 10, 2015", 3 pgs.
"U.S. Appl. No. 13/540,118, Final Office Action mailed Sep. 17, 2014", 11 pgs.
"U.S. Appl. No. 13/540,118, Non Final Office Action mailed Mar. 16, 2015", 15 pgs.
"U.S. Appl. No. 13/540,118, Non Final Office Action mailed May 14, 2014", 11 pgs.
"U.S. Appl. No. 13/540,118, Response filed Jun. 15, 2015 to Non Final Office Action mailed Mar. 16, 2015", 9 pgs.
"U.S. Appl. No. 13/540,118, Response filed Aug. 13, 2014 to Non Final Office Action mailed May 14, 2014", 7 pgs.
"U.S. Appl. No. 13/540,118, Response filed Dec. 12, 2014 to Final Office Action mailed Sep. 17, 2014", 13 pgs.
"U.S. Appl. No. 13/559,643, Non Final Office Action mailed May 7, 2015", 12 pgs.
"Chinese Application Serial No. 201310261793.8, Office Action mailed Mar. 23, 2015", (w/ English Summary), 11 pgs.
"Chinese Application Serial No. 201310271829.0, Office Action mailed Feb. 27, 2015", (w/ English Translation), 19 pgs.
"European Application No. 13003307.9, Response filed Jul. 2, 2014 to European Sesrch Report dated Sep. 26, 2013", 17 pgs.
"European Application No. 13003380.6, European Search Report dated Feb. 17, 2014", 9 pgs.
"European Application No. 13003380.6, Response filed Sep. 17, 2014 to European Search Report dated Feb. 17, 2014", 18 pgs.
"European Application No. 13003307.9, Extended European Search Report dated Sep. 26, 2013", (Sep. 26, 2013), 8 pgs.
"U.S. Appl. No. 13/540,118, Notice of Allowance mailed Jul. 22, 2015", 16 pgs.
"U.S. Appl. No. 13/559,643, Response filed Jul. 20, 2015 to Non Final Office Action mailed May 7, 2015", 8 pgs.
"European Application Serial No. 15155923, Extended European Search Report mailed Aug. 7, 2015", 6 pgs.
"Chinese Application No. 201510087871.6, Office Action mailed Oct. 10, 2016", w/ English Translation, (Oct. 10, 2016), 8 pgs.

* cited by examiner

POWER GENERATION SYSTEM WITH ANTICIPATORY OPERATION

CLAIM OF PRIORITY

This patent application is a continuation-in-part application and claims the benefit of priority, under 35 U.S.C. §120, to U.S. patent application Ser. No. 13/540,118, entitled "STANDBY POWER SYSTEM THAT PREDICTS A NEED TO SUPPLY POWER TO A LOAD TO MINIMIZE START TIME OF A GENERATOR," filed on Jul. 2, 2012, which is hereby incorporated by reference herein in its entirety.

TECHNICAL FIELD

Embodiments pertain to a standby power system, and more particularly to a standby power system that anticipates a change in load and acts to minimize start time of a generator to supply power to the load.

BACKGROUND

Electric generators are typically used to provide electrical power. One common use of electric generators is as a standby power source. A standby power source typically provides power to a load when a primary power source is unable to power the load.

One common type of electric generator includes an internal combustion engine. The internal combustion engine drives an electrical alternator that produces alternating electricity.

Existing standby generator systems utilize an automatic transfer switch (ATS) to monitor the primary power source. The ATS determines that the primary power source is unavailable to provide power to the load, and provides a signal to the standby power source that it should start. Once the standby power source receives this signal, it will initiate a start sequence for the standby power source.

One of the drawbacks with such existing standby power systems is that there is typically a delay between the primary power source becoming unavailable and the standby power source becoming available. One factor causing the delay is that there is typically a gap in time to determine that the primary source is unavailable. This delay is utilized to avoid unnecessary starting of the standby power source when there is a momentary interruption in power provided by the primary power source.

Another factor causing the delay is that the starting sequence of engine driven generators takes valuable time. This delay can be especially problematic in standby power systems where the standby power source requires pre-start preparation. This pre-start preparation causes an increase in start time of the standby power source thereby extending the time that is load is without power.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
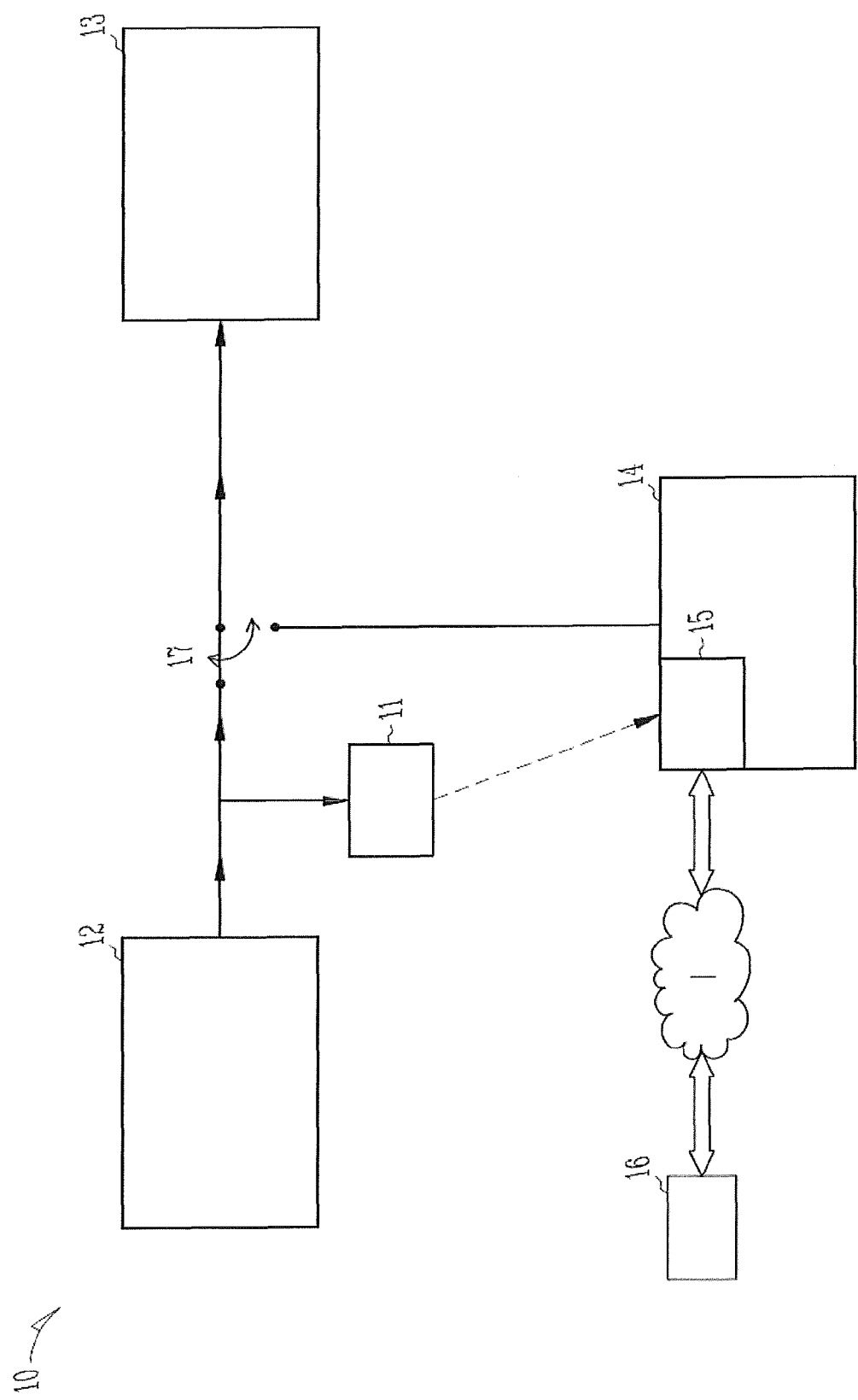
FIG. 1 is a schematic plan view of an example standby power system that includes a sensor where a primary power source is supplying power to a load.
Figure 2:
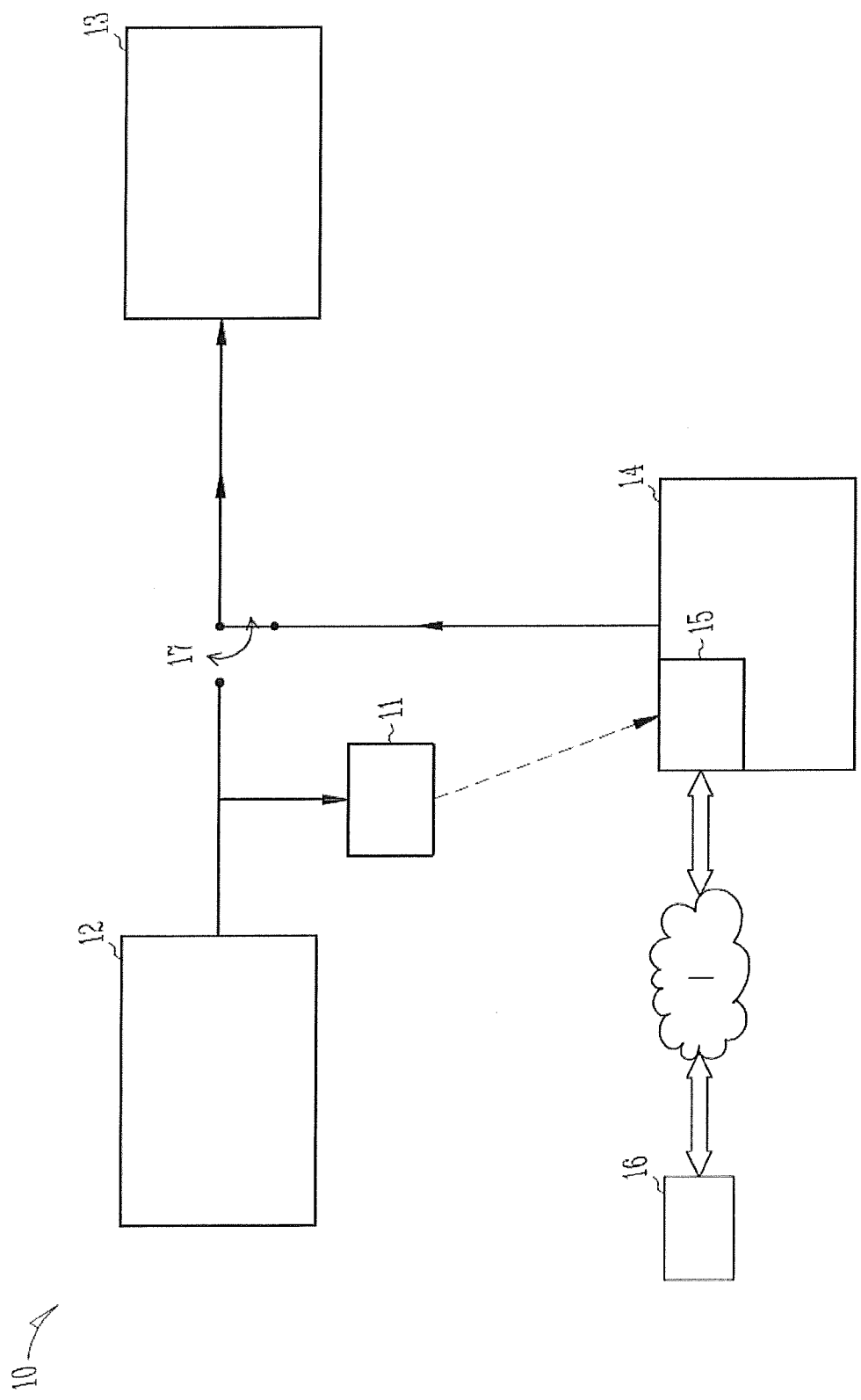
FIG. 2 shows the schematic plan view of FIG. 1 where a standby power source is supplying power to the load.

FIGS. 1-2 are schematic plan views of an example standby power system 10. The standby power system 10 includes a sensor 11 that is adapted to monitor a primary power source 12 that provides power to a load 13. In some embodiments, the sensor 11 may monitor characteristics of the power supplied by the primary power source 12 that may be used to sense abnormalities. As examples, the sensor 11 may monitor (i) the root mean squared voltage of the primary power source 12; and/or (ii) the zero sequence voltage of the primary power source 12.

The standby power system 10 further includes a generator 14 that is also adapted to supply power to the load 13 through switch 17. As an example, the generator 14 may include an internal combustion engine that drives an alternator.

FIG. 1 shows the standby power system 10 where the primary power source 12 is supplying power to the load 13 through switch 17. FIG. 2 shows the standby power system 10 where the standby power source 14 is supplying power to the load 13 through switch 17.

The standby power system 10 further includes a generator controller 15 that operates the generator 14 and exchanges data with the sensor 11. The generator controller 15 predicts a need to supply power to the load 13 based on data received from the sensor 11. The generator controller 15 then acts to minimize the time to availability of the generator 14 based on the prediction. The actions may include performing pre-starting functions to minimize the start time of the generator 14.

Minimizing the start time of the generator 14 based on the prediction may reduce the amount of time during which the load 13 is not receiving power from either the primary source 12 or the generator 14. Decreasing the amount of time in which the load 13 is not supplied with power may allow for (i) the use of smaller uninterruptible power supplies; and/or (ii) reduced facility down time due to lack of power.

In some embodiments, the generator controller 15 may operate an oil pump (not shown) to lubricate mechanical components (not shown) in the internal combustion engine in order to minimize start time of the generator 14 once the primary power source 12 is unable to provide power to the load 13. Operating the oil pump to lubricate the mechanical components may (i) allow quicker starting of the internal combustion engine; (ii) decrease wear on bearing surface thereby increasing the operating life of the internal combustion engine; and/or (iii) provide oil pressure to oil-actuated speed governors or fuel injection systems before generator 14 starting.

Embodiments are also contemplated where the generator controller 15 activates heating elements (not shown) that enhance combustion in the internal combustion engine in order to minimize start time of the generator 14 once it is determined that the generator 14 should be started. Heating elements may be used to (i) heat intake air that is used for combustion or (ii) preheat the combustion chamber. Heating intake air that is used for combustion may permit prompt compression-ignition of an air-fuel mix under cold conditions thereby permitting quicker starting under cold conditions.

In some embodiments, the generator controller 15 may operate air inlet louvers on an enclosure (not shown) for the generator 14 to permit the flow of combustion and cooling air to the generator 14 in order to minimize start time of the generator 14 once it is determined that the generator 14 should be started. Opening the air inlet louvers based on a predicted loss of power from the primary power source 12 may permit quicker starting of the generator 14 because the louvers may not be able to open while the generator 14 is cranking. The louvers may not be able to open while the generator 14 is cranking because (i) the louvers obtain power from generator cranking battery; and/or (ii) the air required by the generator 14 while cranking creates a pressure head that may prohibit the louvers from opening.

Embodiments are also contemplated where the generator controller 15 operates other starting aids. As an example, some type of fluid (e.g., ether, alternative fuels or some other fuel additive) may be injected for combustion to permit quicker starting of the internal combustion engine that is part of the generator 14. As another example, fuel preparation equipment (e.g., a fuel heater, pump or a fuel cooler) may be activated to improve starting of a combustion engine.

It should be noted that the standby power system 10 may further include a server 16 that allows exchanging information with the generator controller 15 and other devices on a network (e.g., the Internet I). At least one of the server devices 16 and the generator controller 15 may predict a need to supply power to the load 13 based on data received from the sensor 11.

Figure 3:
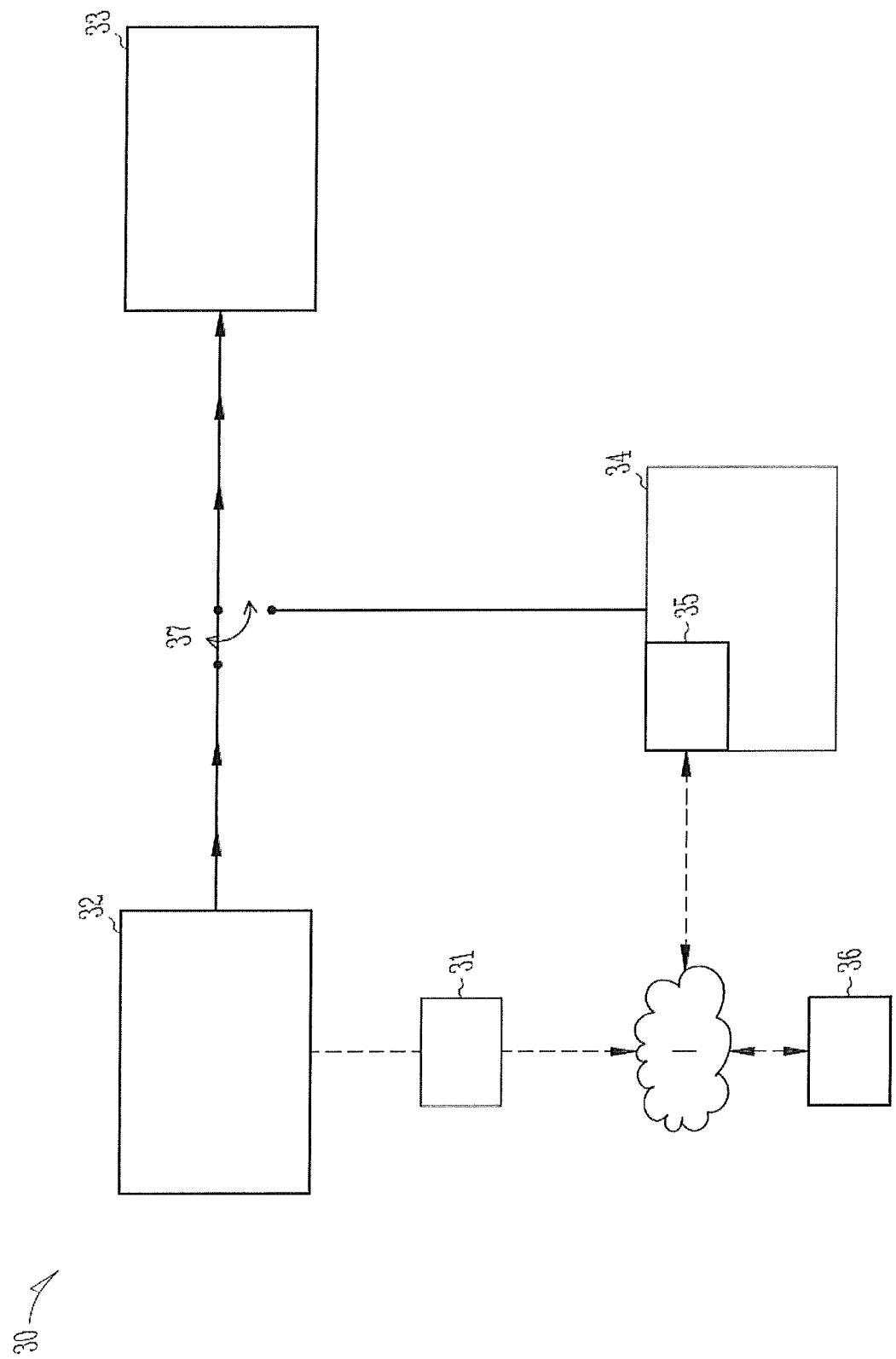
FIG. 3 is a schematic plan view of another example standby power system that includes a notification system where a primary power source is supplying power to a load.
Figure 4:
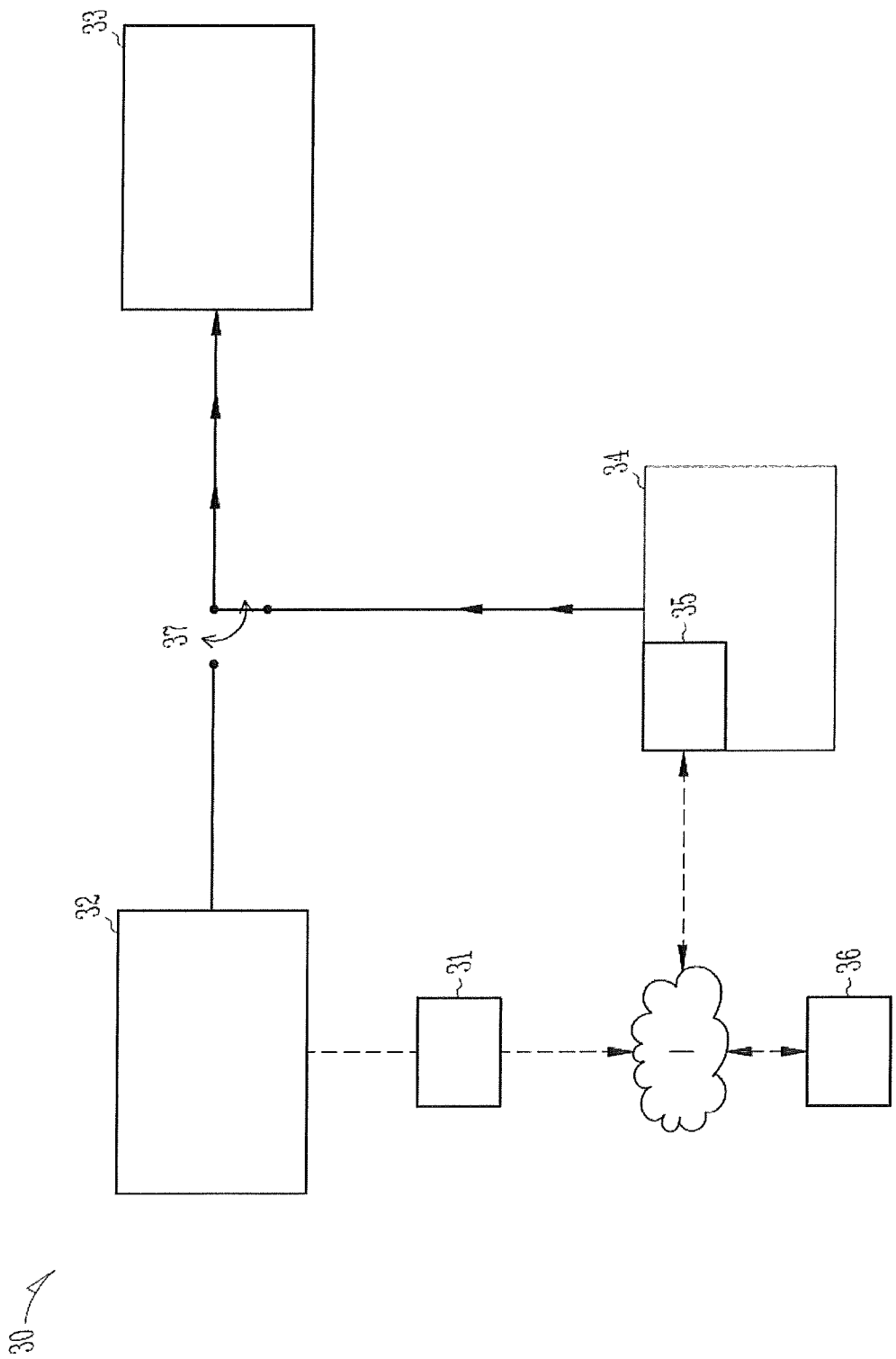
FIG. 4 shows the schematic plan view of FIG. 3 where a standby power source is supplying power to the load.

FIGS. 3-4 are schematic plan views of another example standby power system 30. The standby power system 30 includes a generator 34 that is adapted to supply standby power to a load 33. As an example, the generator 34 may include an internal combustion engine that drives an alternator.

The standby power system 30 further includes a notification system 31 that predicts a need for the generator 34 to supply standby power to the load 33. In some embodiments, the notification system 31 may monitor characteristics of power that is supplied by a primary power source 32. As an example, the notification system 31 may be used to sense abnormalities in the power that is supplied by the primary power source 32 to the load 33.

FIG. 3 shows the standby power system 30 where the primary power source 32 is supplying power to the load 33 through switch 37. FIG. 4 shows the standby power system 30 where the standby power source 34 is supplying power to the load 33 through switch 37.

The standby power system 30 further includes a generator controller 35 that operates the generator 34 and exchanges data with the notification system 31 via a network (e.g., the Internet I). The generator controller 35 predicts a need to supply power to the load 33 based on data received from the notification system 31 relating to power that is supplied by the primary power source 32. The generator controller 35 then acts to minimize a start time of the generator 34 based on the prediction.

Minimizing the start time of the generator 34 based on the prediction may reduce the amount of time during which the load 33 is not receiving power from either the primary source 32 or the generator 34. Decreasing the amount of time in which the load 33 is not supplied with power may allow for (i) the use of smaller uninterruptible power supplies; and/or (ii) reduced facility down time due to lack of power.

Similarly, as discussed above with regard to generator controller 15, the generator controller 35 may (i) operate an oil pump (not shown) to lubricate mechanical components (not shown) in the internal combustion engine in order to minimize start time of the generator 34 once the primary power source 32 is unable to provide power to the load 33; (ii) activate heating elements (not shown) that enhance combustion in the internal combustion engine in order to minimize start time of the generator 34 once the primary power source 32 is unable to provide power to the load 33; and/or (iii) operate air inlet louvers on an enclosure (not shown) for the generator 34 to permit the flow of combustion and cooling air to the generator 34 in order to minimize start time of the generator 34 once the primary power source 32 is unable to provide power to the load 33.

It should be noted that the standby power system 30 may further include a server 36 that exchanges information with the generator controller 35 via a network (e.g., the Internet I). At least one of the server 36 and the generator controller 35 may predict a need to supply power to the load 33 based on data received from the notification system 31 or other information available to the server 36.

Figure 5:
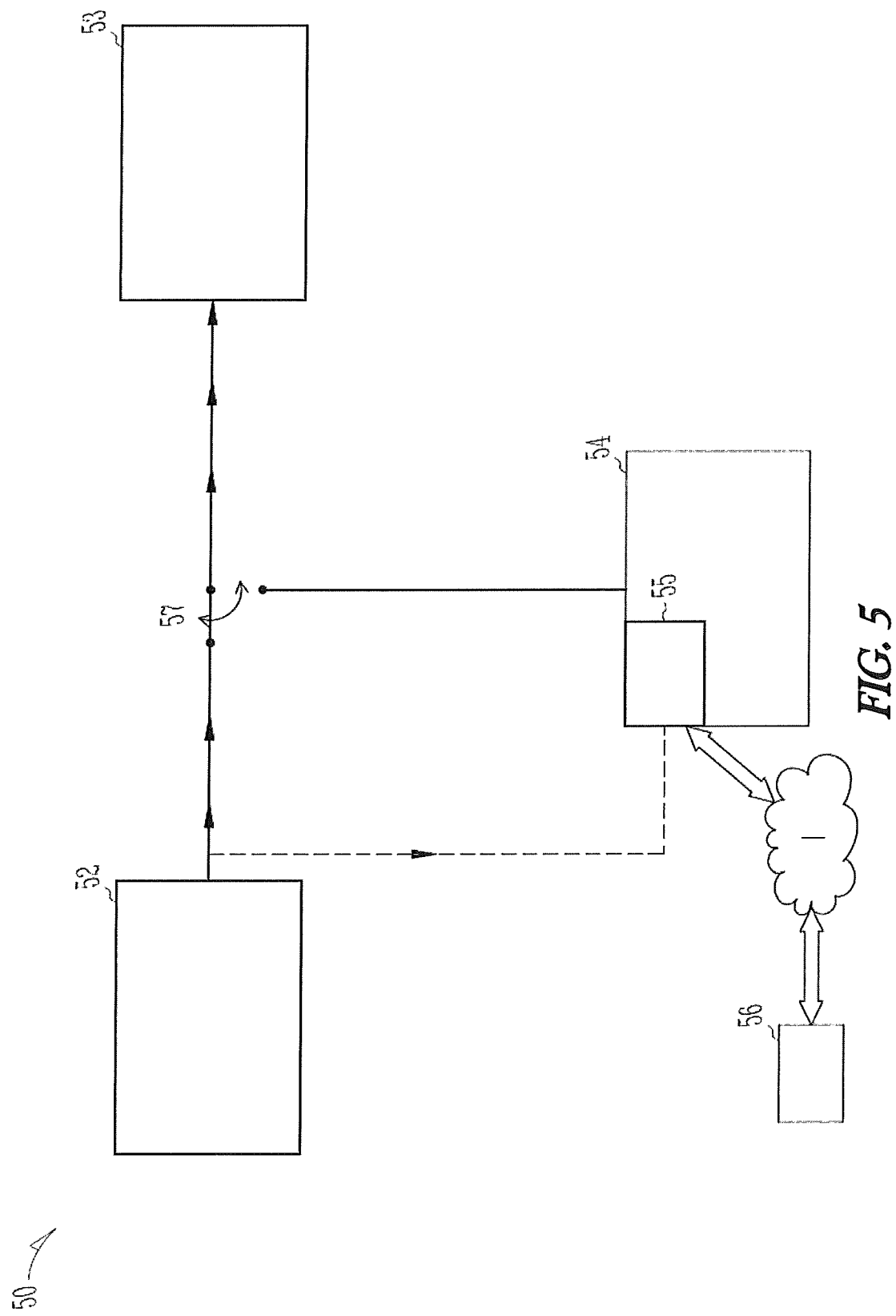
FIG. 5 is a schematic plan view of another example standby power system that includes a generator controller that monitors a primary power source which is supplying power to a load.
Figure 6:
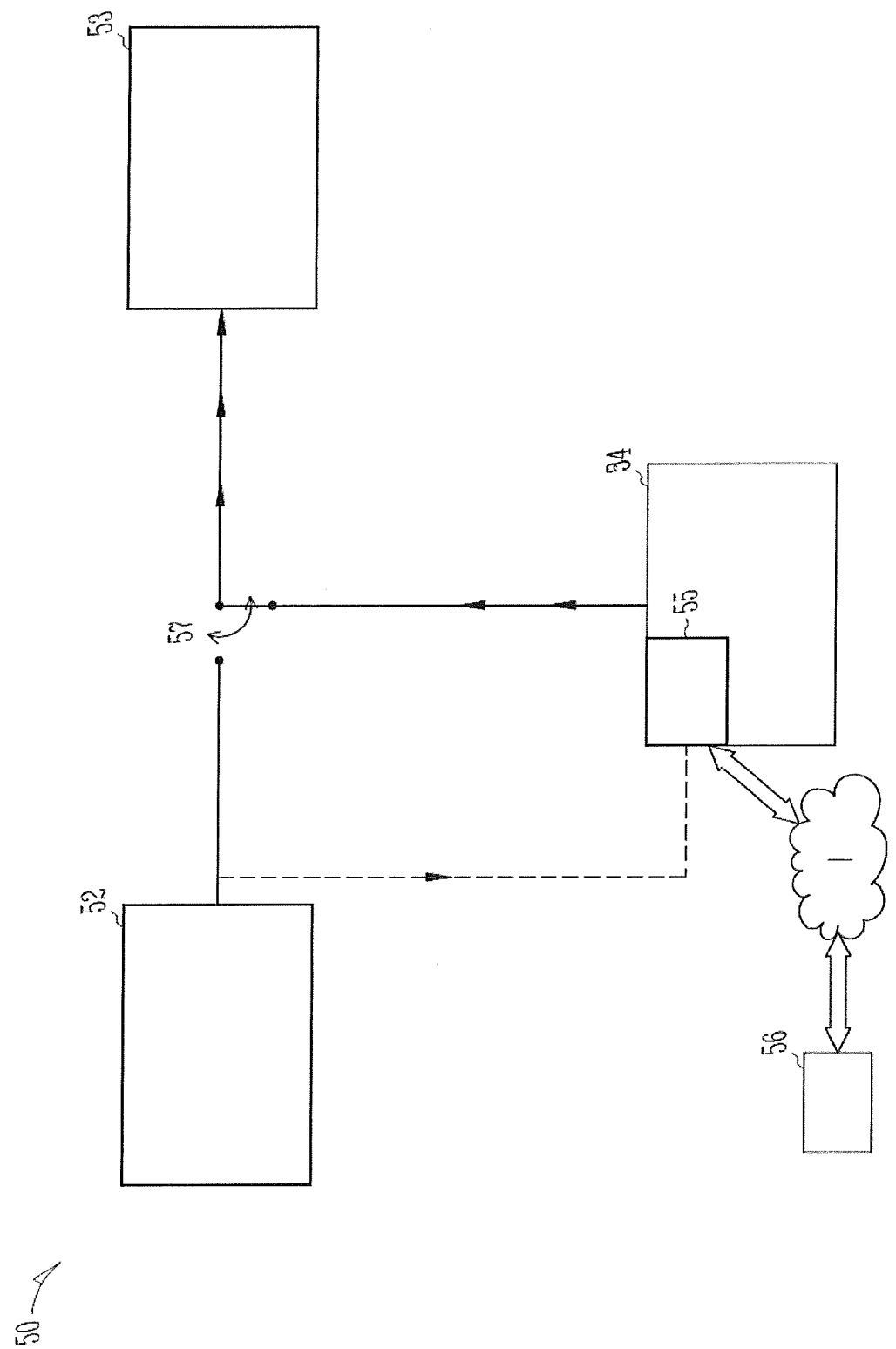
FIG. 6 shows the schematic plan view of FIG. 5 where a standby power source is supplying power to the load.

FIGS. 5-6 are schematic plan views of another example standby power system 50. The standby power system 50 includes a generator 54 that is adapted to supply standby power to a load 53. As an example, the generator 54 may include an internal combustion engine that drives an alternator.

The standby power system 50 further includes a controller 55 that monitors power that is provided to a load 53 by a primary power source 52. The controller 55 starts the generator 54 when the controller 55 anticipates a need for the generator 54 to supply power to the load 53.

In the example embodiment that is illustrated in FIGS. 5-6, the controller is a generator controller that may (or may not) be mounted on the generator 54. Embodiments area also contemplated where the controller is part of a transfer switch (see, e.g., switch 57 in FIGS. 5-6) that is included in the standby power system 50.

In some embodiments, the controller 55 may monitor characteristics of power that is supplied by a primary power source 52. As an example, the controller 55 may be used to sense abnormalities in the power that is supplied by the primary power source 52 to the load 53.

FIG. 5 shows the standby power system 50 where the primary power source 52 is supplying power to the load 53 through switch 57. FIG. 6 shows the standby power system 50 where the standby power source 54 is supplying power to the load 53 through switch 57.

Minimizing the time to availability of the generator 54 based on the prediction may reduce the amount of time during which the load 53 is not receiving power from either the primary source 52 or the generator 54. Decreasing the amount of time in which the load 53 is not supplied with power may allow for (i) the use of smaller uninterruptible power supplies; and/or (ii) reduced facility down time due to lack of power.

Similarly as discussed above with regard to generator controllers 15, 35, the controller 55 may (i) operate an oil pump (not shown) to lubricate mechanical components (not shown) in the internal combustion engine in order to minimize start time of the generator 54 once the primary power source 52 is unable to provide power to the load 53; (ii) activate heating elements (not shown) that enhance combustion in the internal combustion engine in order to minimize start time of the generator 54 once the primary power source 52 is unable to provide power to the load 53; and/or (iii) operate air inlet louvers on an enclosure (not shown) for the generator 54 to permit the flow of combustion and cooling air to the generator 54 in order to minimize start time of the generator 54 once the primary power source 52 is unable to provide power to the load 53.

It should be noted that the standby power system 50 may further include a server 56 that exchanges information with the generator controller 55 via a network (e.g., the Internet I). At least one of the server 56 and the controller 55 may predict a need to supply power to the load 53 based on data collected by the controller relating to power supplied by the primary power source 52 (or other information available to the server 56).

The example standby power systems 10, 30, 50 described herein may serve to perform pre-start preparation for the standby power source. This pre-start preparation for the standby power source may permit quicker starting for the standby power source thereby minimizing the time that the load is in an undesirable unpowered state.

In some instances, a power system (such as one of the power systems 10, 30, or 50) may operate at less than full capacity and may experience a large increase in load or power demand in a short period of time. For example, a marine vessel having multiple generators may, when in open water, operate and use one or less than all of the generators to supply power to a few loads, such as for powering refrigerators, lights, and other electronic devices, while the rest of the generators may remain off and inactive. As the marine vessel approaches a port or highly trafficked seaway, large loads such as bow thrusters may be needed for vessel maneuvering and navigation. In order to meet such increased power demands, the marine vessel may need to start up, bring online, and parallel the rest of the generators with those already operating. However, this may take time and cause a delay in the use of the additional and necessary loads (such as the bow thrusters).

The systems described herein may be used to predict or anticipate, and prepare a power system for, an increased load before the load is actually needed, thereby reducing or eliminating wait time for generators to come online and/or power outages that might otherwise be caused by adding a large load to a system before additional generators are able to start and be brought online.

Figure 7:
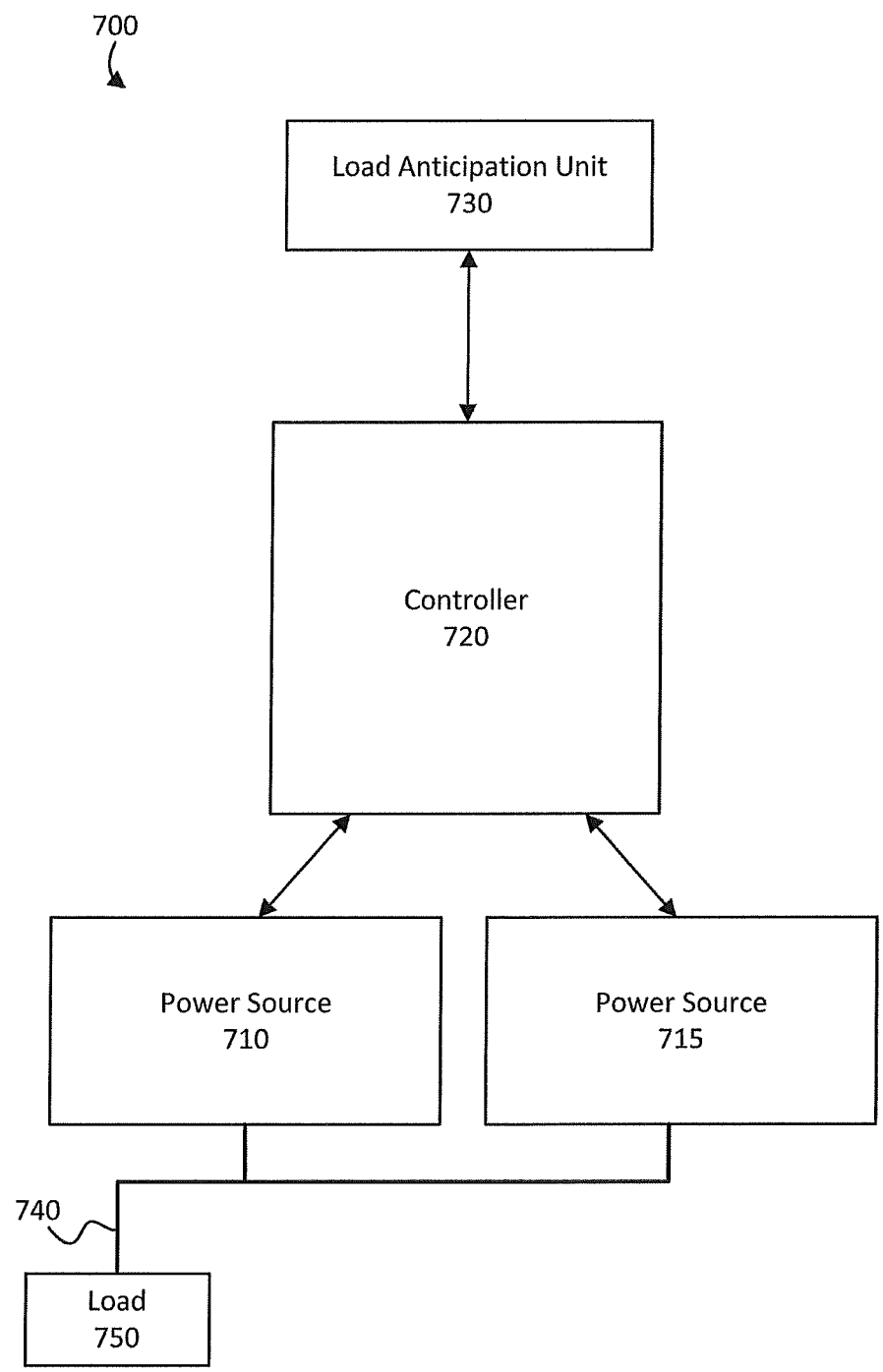
FIG. 7 is an example power system.

FIG. 7 shows an example power system 700. The power system 700 may include one or more power sources 710 and 715. The power sources 710 and 715 may be generators, and may include internal combustion engines powered by gasoline, diesel, various natural gases, or other fuels, and connected with alternators to generate electrical energy. In other examples, the power sources 710 and 715 may alternatively be other types of generators (such as turbine generators), or other devices that generate electrical energy. One or more of the power sources 710 and 715 may be similar or different. While two power sources 710 and 715 are shown, the power system 700 may include any number of power sources.

The power sources 710 and 715 may be connected with a bus 740, which in turn may be connected with a load 750. The power sources 710 and 715 may be used in at least three modes, including a power supply mode, an offline mode, and an inactive mode. In the power supply mode, the power sources 710 and 715 may be operating, may be connected to the bus, and may be supplying power to the load 750. In the offline mode, the power sources 710 and 715 may be operating and available to supply power to the load 740, but may not be connected to the bus 740. In the inactive mode, the power sources 710 and 715 may not be operating, may not be connected to the bus, and may not be supplying power to the load. Other variations are possible.

The power system 700 may include one or more controller 720. The controller 720 may communicate with and/or control one, more than one, or all of the power sources 710 and 715. For example, the controller 720 may control operating conditions of the power sources 710 and 715, such as turning on/starting and turning off/stopping the power sources 710 and 715, connecting or disconnecting the power sources 710 and 715 from the bus 740, initiating and/or performing synchronization and other paralleling operations of the power sources 710 and 715, controlling the speed and output voltage or current of the power sources 710 and 715, determining and setting or changing a mode of operation for the power sources 710 and 715, and various other conditions and parameters. Additionally or alternatively, the controller 720 may communicate with one or more other devices or controllers, such as over a wired or wireless network.

The power system 700 may operate in at least three states, including a standard state, an anticipation state (also referred to as a prediction state), and an off state. In some examples, the power system 700 may also operate in a modified anticipation state (or modified prediction state), as discussed later. The mode of the power sources 710 and 715 may depend on the operating state of the power system 700. One or more controller 720 may control the power sources 710 and 715 and/or a state of operation for the power system 700 as a whole.

In the standard state, one or more of the power sources 710 and 715 may be running and supplying power to the load 750 (in a power supply mode) as needed by the present power demands of the load 750. Power sources 710 and 715 that are not used to supply power to the load 750 may be in an inactive mode.

In the standard state, the controller 720 may monitor the bus 740 and load 750, and may identify the power demands of the load 750. The controller 720 may determine which power sources 710 and 715 to operate to meet the present power demands, and may control the operating mode of one or more of the power sources 710 and 715 accordingly. The controller 720 may determine which power sources 710 and 715 to operate based on any number of factors, including using a predetermined or algorithmically selected order of operation, and/or based on various system parameters such as fuel efficiency. In some systems, the controller 720 may operate the power sources 710 and 715 based on the present load conditions, and not based on any predicted or anticipated load conditions. Other variations are possible.

When the power system 700 operates in the standard state during a steady period of operation with no power demand changes, all power sources 710 and 715 generally are in either a power supply mode or an inactive mode, and none are generally in an offline mode. When the power demands of the load 750 change during the standard state of operation (a dynamic period of operation), the controller 720 may adjust the operating mode of one or more power sources 710 and 715 to accommodate the change. During some adjustments, such as when one or more previously inactive power sources 710 and 715 are started to supply additional power to the load 750, the adjusted power sources 710 and 715 may temporarily operate in an offline mode. This may be useful to provide the power sources 710 and 715 with time to meet parameters (such as speed and frequency) necessary to parallel with other power sources 710 and 715 already supplying power to the load 750. In the standard state of operation, these power sources 710 and 715 are automatically added to the bus 740 when ready and compatible with the power being supplied through the bus 740, after which the power system 700 returns to a steady period of operation in the standard state.

In the anticipation state, one or more of the power sources 710 and 715 that may not be needed by the present power demands of the load 750 may be controlled and operated (such as by the controller 720) to run, ready to provide additional power to meet predicted or anticipated increased power needs, should the power demand of the load 750 increase. The controller 720 may control or operate the power sources 710 and 715 (or the power system 700 as a whole) based on an identification of an anticipated load increase, such as from a load anticipation unit 730 as discussed below.

In the anticipation state, power sources 710 and 715 that were previously running in a power supply mode may continue to operate and supply power to the load 750 in the power supply mode to meet the present power demands. Additionally, one or more additional power sources 710 and 715 that may not be needed by the present power demands of the load 750 may be started and operated in a variety of ways. For example, in some systems, the one or more additional power sources 710 and 715 may be started and operated in an offline mode until needed (at which point the additional power sources 710 and 715 may be controlled to operate in a power supply mode) or until the anticipation state is no longer necessary. In other systems, the one or more additional power sources 710 and 715 may be started, brought online, and operated in a power supply mode along with the other power sources 710 and 715 already operating in the power supply mode. In these example systems, all of the operating power sources 710 and 715 may experience lower loads than may be necessary, preferred, or most efficient. In these systems, the power sources may be capable of very fast reactions to an actually increased load. In still other systems, the one or more additional power sources 710 and 715 may be run and brought online, at which point the controller 720 may remove the fuel being supplied to the additional power sources 710 and 715. As a result of this, the other power systems 710 and 715 already operating in the power supply mode may continue to drive the additional power sources 710 and 715 to move at the appropriate speed and frequencies necessary for paralleling, but none of the operating power systems 710 and 715 may experience significantly lower load demands. In some of these systems, fuel consumption may be reduced (based on not supplying fuel to the additional power sources 710 and 715) and/or the supplied power sources 710 and 715 may operate more efficiently (based on near normal load demands).

In any of these systems, power sources 710 and 715 that are not necessary to meet the present or anticipated load demands may remain in an inactive mode. In alternative example systems, when an anticipate load increase is identified, all inactive power sources 710 and 715 may be changed to an offline mode of operation. Other variations and possibilities for operation in an anticipation state are possible.

The controller 720 may identify and control the power system 700 depending on the type of anticipated or predicted load signals or data in a variety of ways. In some systems, the controller 720 may determine an anticipated or predicted load increase quantity. For example, in some systems, the controller 720 may associate all predicted or anticipated load increase identifications under some conditions with the same anticipated load increase quantity. As a specific example, when bow thrusters are not actively in use, the controller 720 may interpret any identification of an anticipated load increase, regardless of the source or type, as anticipating a 50 kW load increase for expected bow thrusters. Accordingly, the controller 720 may start and operate one or more power sources 710 and 715 that were previously in an inactive mode and operate the system in the anticipation state to meet the anticipated load increase quantity.

In other example systems, the controller 720 may distinguish between different predicted or anticipated load increases based on various parameters in determining a predicted or anticipated load increase quantity. As an example, the controller 720 may associate an anticipate load increase signal from one source (such as from a GPS) with a first anticipated load increase quantity (such as a quantity associated with operation of bow thrusters), while associating an anticipated load increase signal from a second source (such as from a clock) with a second anticipated load increase quantity (such as a quantity associated with a cooking appliance such as an oven or microwave).

In other example systems, the controller 720 may, upon identification of an anticipated load increase, calculate or estimate an anticipated increased load amount based on various parameters. For example, the controller 720 may calculate or estimate an anticipated increased load amount based on a vessel location, speed of the vessel, day/time, comparison of anticipated load to the present power system capacity, determination of loads anticipated to be added, or various other parameters.

As another example, the controller 720 may use parameter information and historical data to estimate an anticipated load increase quantity. For example, the controller 720 may compare location or load data to historical routes or load profiles, and where the comparison indicates a correlation, the controller 720 may use the stored historical route or load profile information to identify a predicted load increase quantity.

The controller 720 may start and operate power sources 710 and 715 that were previously in an inactive mode and operate the system in the anticipation state to meet the anticipated load increase quantity calculated or estimated in any of these example systems.

The controller 720 may choose which of the power sources 710 and 715 to operate during the anticipation state to meet the determined anticipated load increase in various ways, such as by estimating a load increase from historical data, user inputs, or other indicators. In any of these systems, the determination may take into account a variety of factors, such as the fuel efficiency of the power sources 710 and 715 and selected or determined orders of starting or operating power sources 710 and 715. In these systems, one or more power systems 710 and 715 that are not needed to meet the present power demands or the anticipated load increase may remain in an inactive mode.

In other example systems, the controller 720 may, upon receipt of an indication of an anticipated load increase, operate and/or control all of the previously inactive power sources 710 and 715 to start and operate (such as in an offline mode, in an online mode with a lower load demand, or in an online mode without fuel), and may control the power system to operate in the anticipation state. In these example systems, the controller 720 may not need to estimate or calculate an anticipated load increase quantity, as all available power sources 710 and 715 may be started. Many other variations are possible.

For simplicity, this disclosure often considers the scenario where at least one of the power sources 710 and 715 are not operating in a power supply mode when a load increase is anticipated. However, in some circumstances, all power sources 710 and 715 may already be operating in a power supply mode with an anticipated load increase is detected. Under these circumstances, the power system 700 may function in a number of ways. In some systems, the power system 700 may ignore the anticipated load increase and continue to operate in a standard state. In other systems, the power system 700 may flag or note the anticipation and/or may operate in a modified anticipation state. In systems operating in a modified anticipation state, if the load demand decreases and one or more power sources 710 and 715 are no longer needed to meet the present power demands, the power system 700 may revert to a normal anticipation state, and one or more of the power sources 710 and 715 that are not needed to meet the present power demands may be operated in one of the various ways as described herein. Other variations are possible.

In the addition to the standard state and anticipated state of operation, the power system 700 may additionally be in an off state. In an off state, the power sources 710 and 715 may be in an inactive mode, such that none of the power sources 710 and 715 may be running, and no power may be supplied to the load. Other variations and states of operation are possible.

The power system 700 may detect an anticipated load increase in various ways. For example, the power system 700 may include one or more load anticipation units 730 (also may be referred to as load prediction units), which may be in communication with the controller 720. The controller 720 may control an operation mode of one or more power sources 710 and 715 or the power system 700 based on inputs or signals received from the load anticipation unit 730.

The power system 700 may include, or be in communication with, one or more devices used to identify or monitor various parameters used to identify an anticipated or predicted load increase. For example, the load anticipation device 730 may include, or be in communication with, a global positioning system ("GPS"). In other systems, the controller 720 may be in communication with the GPS. The GPS may identify or monitor a position, direction, speed, and/or acceleration of the power system 700. The position, direction, speed, and/or acceleration of the power system 700 may be used by the load anticipation unit 730 or the controller 720 to identify an anticipated load increase. The GPS may communicate the position, direction, speed, and/or acceleration of the power system 700 to the load anticipation unit 730 or controller 720 periodically, continuously, randomly, when triggered, or at various other times or events. The GPS may additionally or alternatively communicate a position, direction, speed, and/or acceleration message or alert when triggered, such as when the position of the power system 700 is within (or beyond) a threshold distance from a point or area of interest.

As one example, a GPS may monitor a location of a power system 700 on a boat, and when the location of the power system 700 is within a designated distance of a port, the GPS may communicate a position message such as "Near Port." As another example, a GPS may periodically or continuously send the location of the power system 700 to the controller 720 or the load anticipation unit 730, without separately performing any internal comparisons or algorithms to associate the location with any triggers or events. In this alternative, the controller 720 may use the position information to identify an anticipated load increase.

The power system 700 may additionally or alternatively include one or more other devices for identifying or monitoring various parameters used to identify an anticipated or predicted load increase. For example, the controller 720 or the load anticipation unit 730 may include, or be in communication with, a clock. The time experienced by the power system 700 may be used by the load anticipation unit 730 or the controller 720 to identify an anticipated load increase. The clock may communicate the time of the power system 700 to the load anticipation unit 730 or controller 720 periodically, continuously, randomly, when triggered, or at various other times or events. The clock may additionally or alternatively communicate a time message or alert when triggered, such as when the time reaches or passes a given target time. As an example, the clock may send a "Breakfast" time message to the controller 720 or the load anticipation unit 730 in the morning (such as at 6:00 am). The controller 720 may use the time message (or time information) to identify an anticipated load increase, such as an increase in power needed to operate breakfast electronic devices.

The power system 700 may additionally or alternatively include one or more user input devices which may facilitate input from a user. For example, the load anticipation unit 730 may include, or be in communication with, a joystick or lever (or sensor within a joystick or lever) which, when moved in a certain position, jiggled in a certain way, or otherwise activated by a user, provides a user input that may be used to identify an anticipated load increase. As another example, the user input device may be or include a switch, button, or other manually operable device that, when manipulated by a user in a particular way, provides an input that may be used to identify an anticipated load increase. The user input device may be various other devices that can receive or detect a user manipulation or activation.

Users may manipulate the user input device to indicate that additional power is likely to be needed in the near future. As an example, a captain may move a throttle lever in a recognizable fashion, or to a designated position, as the ship nears a port. The user input device may detect or identify the movement, which the user input device, the load anticipation unit 730, or the controller 720 may use to identify that additional power will soon be needed to power the bow thrusters. Various other examples are possible.

The load anticipation unit 730 or the controller 720 may identify an anticipated load increase based on one or more of the monitored parameters or inputs from the user input devices. For example, the load anticipation unit 730 or the controller 720 may interpret all positions messages of certain types from a GPS (such as "Near Port," "Near Lock," or "Shallow Water") as indications of an anticipated load increase. As another example, the load anticipation unit 730 or the controller 720 may interpret the movement of a throttle lever to a designated "standby," "offline," or "anticipation" position as an indication of an anticipated load increase.

The controller 720 (or the load anticipation unit 730) may identify an anticipated load increase based on a load profile. For example, the controller 720 may store one or more load profiles which the controller 720 may associate with an increased load. In some instances, the load profiles may correspond to one or more actions or load changes that often or always occur before a load significantly increases. For example, the stored load profile may identify or correspond to a load increase due to the turning on of a fog light or fog horn, which may typically precede the activation of bow thrusters. The controller 720 may compare an identified load (or load profile) with the stored load profile, and may identify an anticipated load increase when the identified load matches the stored load profile.

In some systems, the load profile may be predetermined and stored in a memory accessible to, or part of, the controller 720. In other systems, the controller 720 may learn and store the load profile, such as by tracking or using stored or historical data about previous load increases and/or patterns in previous activity of the power system 700. For example, the controller 720 may track one or more occurrences where a load powered by the power system 700 increased, and may identify one or more common load events or load profiles that preceded the load increase. The controller 720 may store the common load events or load profiles, and may use these stored events or profiles for comparison with future identified loads to determine anticipated load increases. The controller 720 may store data about the power system 700 for use in learning load profiles experienced by the power system 700 continuously, regularly, at intervals, randomly, or when triggered, such as when a load changes.

The controller 720 may implement an additional operation recognition parameter based on vocational loads that relay a distress or fault code which may require the need of other machinery with additional load to handle the potential shutdown of the vocational load. For example, the hydraulics for a steering system may relay a distress or fault code, which the controller 720 may interpret as a potentially dangerous situation. Accordingly, the controller 720 may start an additional power source 710 to handle the load of the electrical rudder control back-up system. Other variations are possible.

The controller 720 may modify load profiles (predetermined or learned) as new data is identified and stored by the system. For example, the controller 720 may track one or more occurrences where a load powered by the power system 700 increased, and may compare the tracked data with the stored load profile. The controller 720 may store new trends or anticipated load increase events that are identified, and/or may delete old trends that no longer appear to coincide with anticipated load increases. The controller 720 may require multiple consecutive iterations of different behavior from the power system 700 before creating and storing a new trend or deleting an old trend. Many other variations are possible.

The controller 720 may identify an anticipated load increase based on a stored or anticipated route. The controller 720 may store one or more routes, or portions of routes, which the controller 720 may associate with an increased load. For example, the controller 720 may store a route of a cargo ship, which may include portions near ports, in the open sea, and down rivers or through locks. Portions of the route, such as the portions near the ports, down the rivers, or through locks, may be associated with an anticipated load increase. The controller 720 may compare an actual location of the power system 700 with the route, and may identify an anticipated load increase when the actual location corresponds to a portion of the route associated with an anticipated load increase.

In some systems, the route may be predetermined and/or stored in a memory accessible to, or part of, the controller 720. For example, a cruise line may pre-program or store a route that it intends to follow into the memory of the controller 720. In other systems, the controller 720 may learn and store a route, such as by tracking or using stored or historical route data. For example, a cargo ship may store location and load information regularly, and may identify routes that are taken multiple times. When a vessel repeatedly or always follows the same route, the controller 720 may recognize the load pattern (such as from a closed loop memorization algorithm), and may anticipate the change in load during subsequent trips along the same route accordingly.

The controller 720 may modify routes (predetermined or learned) as new data is identified and stored by the system. For example, the controller 720 may compare the new route to the old route, and may track one or more occurrences where an expected route deviated. The controller 720 may store the changed routes that are identified, and/or may delete old routes that no longer appear to coincide with anticipated load increases. The controller 720 may require multiple consecutive iterations of different behavior from the power system 700 before creating and storing a new routes or deleting an old route. Many other variations are possible.

Alternatively or in addition to a location device, the load anticipation unit 730 or controller 720 may communicate with one or more other devices which may provide information used in determining an anticipated load increase. For example, the load anticipation device 730 or controller 720 may communicate with an anchor system, which may provide information about a state of an anchor or anchors. The controller 720 may use information about the state of the anchor in conjunction with one or more other parameters to determine an anticipated load increase.

The load anticipation unit 730 or the controller 720 may monitor, analyze, and/or interpret a combination of factors in identifying an anticipated load increase. For example, the load anticipation unit 730 or the controller 720 may determine that a particular combination of a GPS location with a directional heading (such as from an electronic compass or the GPS) indicates an anticipated load increase. The load anticipation unit 730 or the controller 720 may determine an anticipated load increase when the GPS location is within a designated distance from a point or area of interest (such as a port or lock) and the directional heading indicates that the power system 700 is traveling toward (or not traveling away from) the point or area of interest. In this example, if either the GPS location indicates that the power system 700 is not within a designated distance from a point or area of interest, or the directional heading indicates that the power system 700 is not traveling toward (or traveling away from) the point or area of interest, the load anticipation unit 730 or the controller 720 may consider this as indicative that the no load increase is anticipated. In some of these examples, the load anticipation unit 730 or the controller 720 may additionally or alternatively base the identification of the anticipated load increase on the speed of the power system 700 or power source 710 or 715 (or vessel carrying the power system 700 or power source 710 or 715).

As another example, the load anticipation unit 730 or the controller 720 may determine that a particular combination of a user input and a GPS location indicates an anticipated load increase. The load anticipation unit 730 or the controller 720 may determine an anticipated load increase when a user input device detects a user input indicative of a possible anticipated load increase and the GPS location is within a designated distance from a point or area of interest (such as a port or lock). However, in this example, if the GPS location indicates that the power system 700 is not within a designated distance from a point or area of interest, the load anticipation unit 730 or the controller 720 may ignore the user input as an accidental movement.

As another example, the load anticipation unit 730 or the controller 720 may determine that a combination of an anchor state and another parameter (such as a clock, load profile, and/or location) indicate an anticipated load increase. For example, the controller 720 may determine that a load increase is anticipated at a given time when the anchor is down, such as in the morning when breakfast is generally served and additional power is needed. As another example, the controller 720 may determine that a load increase is anticipated when a particular load profile (such as a profile associated with the switching on of lights) when the anchor is down, which also may occur (for example) in the morning when additional power may be needed.

In some other examples, the load anticipation unit 730 or the controller 720 may use one or more parameters to preclude an indication of an anticipated load increase. For example, in some systems, the controller 720 may associate an anchor down as a circumstance precluding an anticipated load increase (such as because no bow thrusters will be used while the anchor is down). In these systems, the controller may ignore the bump or jiggle of a control lever as an anticipated load increase event, as the anchor is down. Many other examples and variations are possible.

In some systems, the load anticipation unit 730 may identify an anticipated load increase itself. The load anticipation unit 730 may communicate the identified anticipated load increase to the controller 720. For example, the load anticipation unit 730 may provide an anticipated load status to the controller 720. Examples of statuses that the load anticipation unit 730 may provide to the controller 720 may include a "no anticipated load increase" status or "anticipated load increase detected" status. The load anticipation unit 730 may provide the anticipated load status to the controller 720 continuously, periodically, randomly, when triggered, when the status changes, or at various other times. The load anticipation unit 730 may additionally or alternatively provide a triggered alert or indication of the anticipated load increase to the controller 720. The load anticipation unit 730 may transmit status information or an alert to the controller 720 as a digital signal or other transmission, or the controller 720 may actively monitor the load anticipation unit 730 to extract the status or alert information as desired.

In other systems, the load anticipation unit 730 may communicate information about the monitored parameters and/or user inputs to the controller 720. In these systems, the controller 720 may then use the communicated information to determine or identify an anticipated load increase. Such information may be transmitted by the load anticipation unit 730, or extracted by the controller 720, continuously, periodically, when triggered, randomly, or at various other times. In still other systems, no load anticipation unit 730 may be included. Other variations are possible.

The controller 720 may control the state of operation for the power system 700 based on the information received from the load anticipation unit 730. The controller 720 may, for example, control the power system 700 to operate in a standard state when information from the load anticipation unit 730 indicates that there is no anticipation of an increased load. For example, where the controller 720 receives status updates, alerts, or parameter/user input data from the load anticipation unit 730 that indicate that no load increase is anticipated, the controller 720 may operate the power system 700 in the standard state, with power sources 710 and 710 operating in either a power supply mode or an inactive mode as dictated by the present power demands of the load 750, irrespective of any future potential load changes.

However, upon receive of information from the load anticipation unit 730 that indicates that there is an anticipated load increase, the controller 720 may change a mode of operation of the power system 700 to an anticipation state. For example, where the controller 720 receives status updates, alerts, or parameter/user input data from the load anticipation unit 730 or other devices that indicate that there is an anticipated load increase, the controller 720 may operate the power system 700 in the anticipated state. The controller 720 may control one or more power sources 710 and 715 previously operating in an inactive mode to start and operate (such as in an offline mode, in an online mode with a lower load demand than needed by the present power demand, or in an online mode without fuel).

The controller 720 may control and operate the power system 700 in the anticipation state for various lengths of time and based on various parameters. For example, in some systems, the controller 720 may operate the power system 700 in the anticipation state continuously until the power system 700 is either shut off or the load actually increases. If the load actually increases, the controller 720 may operate the power system 700 in the standard state, running the power sources 710 and 715 to meet the increased load demands.

As another example, in some systems, the controller 720 may start a timer when an anticipated load increase is detected. The controller 720 may operate the power system 700 in the anticipation state until the power system 700 is shut off, the load actually increases, or until the timer indicates that a certain period of time has elapsed without an anticipated load increase. In the latter case where the timer indicates that a certain period of time has elapsed, the controller 720 may revert to operating the power system 700 in the standard state, and may return any power sources 710 and 715 not needed for the present power demands to an inactive mode. In some variations, the timer may be restarted when an anticipated load increase in again detected, such as when a user input device identifies another input.

As another example, in some systems where the controller 720 maintains the power sources 710 and 715 needed for an anticipated load increase in an offline mode, the power system 700 may remain in the anticipation state until none of the power sources 710 and 715 are operating in an offline mode.

As another example, the controller 720 may operate the power system 700 in the anticipation state until information from the load anticipation unit 730 no longer indicates an anticipated load increase. For example, the controller 720 may maintain the power system 700 in an anticipation state as long as location information indicates that the power system 700 is in an area that typically requires an increased power demand. In these examples, the controller 720 may control the power system 700 to operate in a standard state when the location information indicates that the power system 700 has moved out of the area typically requiring an increased power demand.

As another example, the controller 720 may operate the power system 700 in the anticipation state until the power system 700 receives a signal to stop the anticipation state or return to a standard state.

As another example, the controller 720 may operate the power system 700 in the anticipation state until a utility power is available for a load, such as until shore power available or detected by the power system 700.

As another example, in some systems where the anticipated load increase is based on multiple parameters (such as based on an anchor status and a location), the controller 720 may operate the power system 700 in the anticipation state until any one of the dependent parameters changes to a state that no longer indicates an anticipated load increase. For example, where the controller 720 identifies an anticipated load increase when an anchor is up and a location is within a threshold, the controller 720 may control the power system 700 to operate in a standard state when the anchor state changes to a down state, no longer indicating an anticipated load increase. In other systems, once the anticipated load increase is determined, the parameters necessary to make that determination (such as anchor state and location, in the above example) may be ignored or disregarded. Other variations are possible.

In some example systems, the controller 720 may operate the power system 700 until the earlier of some or all of these conditions are satisfied. In any of the above-described examples, if the load actually increases before the controller 720 changes the state of the power system 700 from the anticipation state, the controller 720 may control the power sources 710 and 715 to meet the increased power demand and may control the power system 700 to operate in the standard state, meeting the increased power demands. Many other variations are possible.

Figure 8:
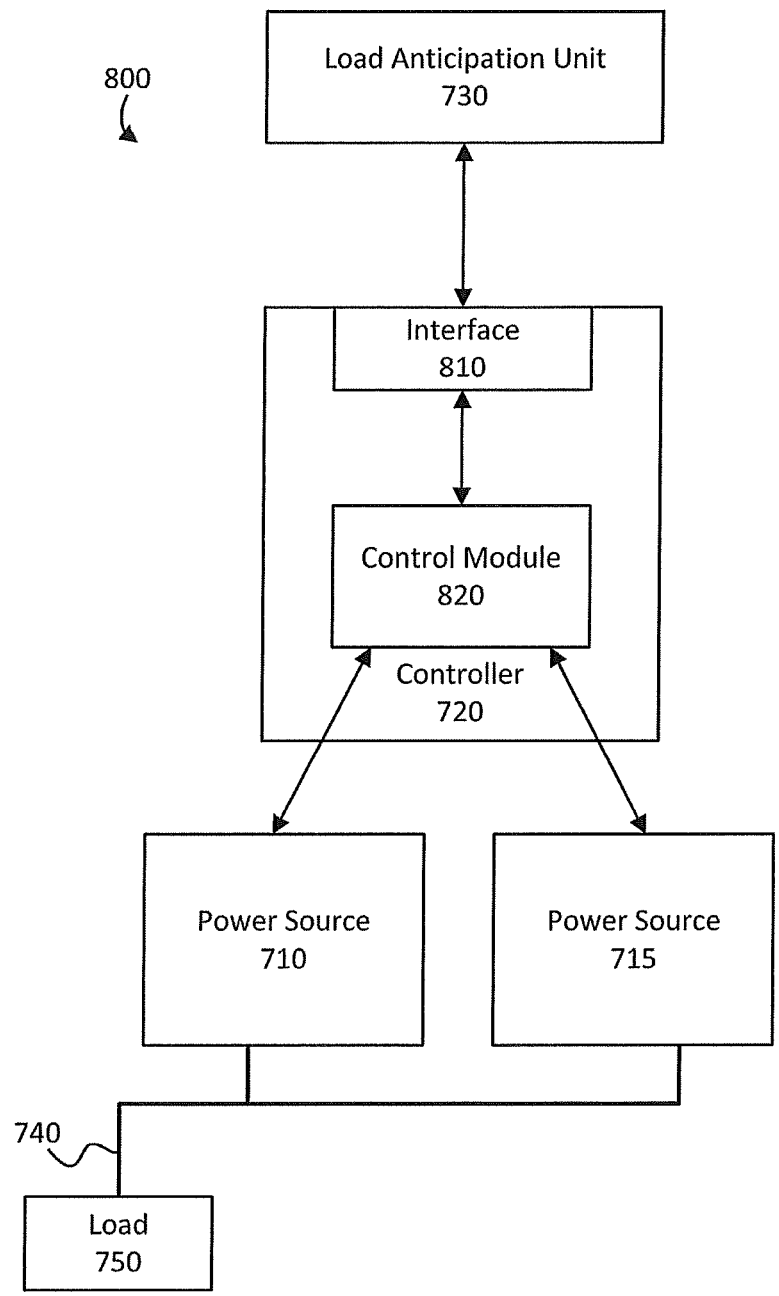
FIG. 8 is another example power system.

FIG. 8 shows an example power system 800. The power system 800 may be similar to, and/or a more detailed example of, the power system 700, and may include a controller 720 and a load anticipation unit 730 separate from, and in communication with the controller 720.

The controller 720 may include an interface 810 and a control module 820. The interface 810 may interface with, receive signals from, and/or extract data from the load anticipation unit 730. The interface 810 may gather information, such as status messages, alerts, and/or parameter information or user inputs from the load anticipation unit 730.

Some inputs 810 may be configured to interface and communicate with more than one type of load anticipation unit 730, or with more than one component of the load anticipation unit 730. For example, the interface 810 may be a port that is compatible with a number of load anticipation unit 730. A variety of load anticipation units 730 may, for example, plug into (or be plugged into by) the interface 810. In some examples, the interface 810 may include more than one port or interface for communicating with more than one load anticipation unit 730. Other variations are possible.

The interface 810 may communicate with a control module 820 of the controller 720. The interface 810 may send information from the load anticipation module 730 to the control module 820, or the control module 820 may monitor the interface 810 to determine when the interface 810 receives information from the load anticipation unit 730 and what that information is. Other variations are possible.

The control module 820 may include logic for controlling the operating state of the power system 800 and/or the operating parameters of the power sources 710 and 715. For example, the control module 820 may be the portion of the controller 720 that may control operating conditions of the power sources 710 and 715, such as turning on/starting and turning off/stopping the power sources 710 and 715, connecting or disconnecting the power sources 710 and 715 from the bus 740, initiating and/or performing synchronization and other paralleling operations of the power sources 710 and 715, controlling the speed and output voltage or current of the power sources 710 and 715, determining a mode of operation for the power sources 710 and 715, and various other conditions and parameters. Other variations are possible.

Figure 9:
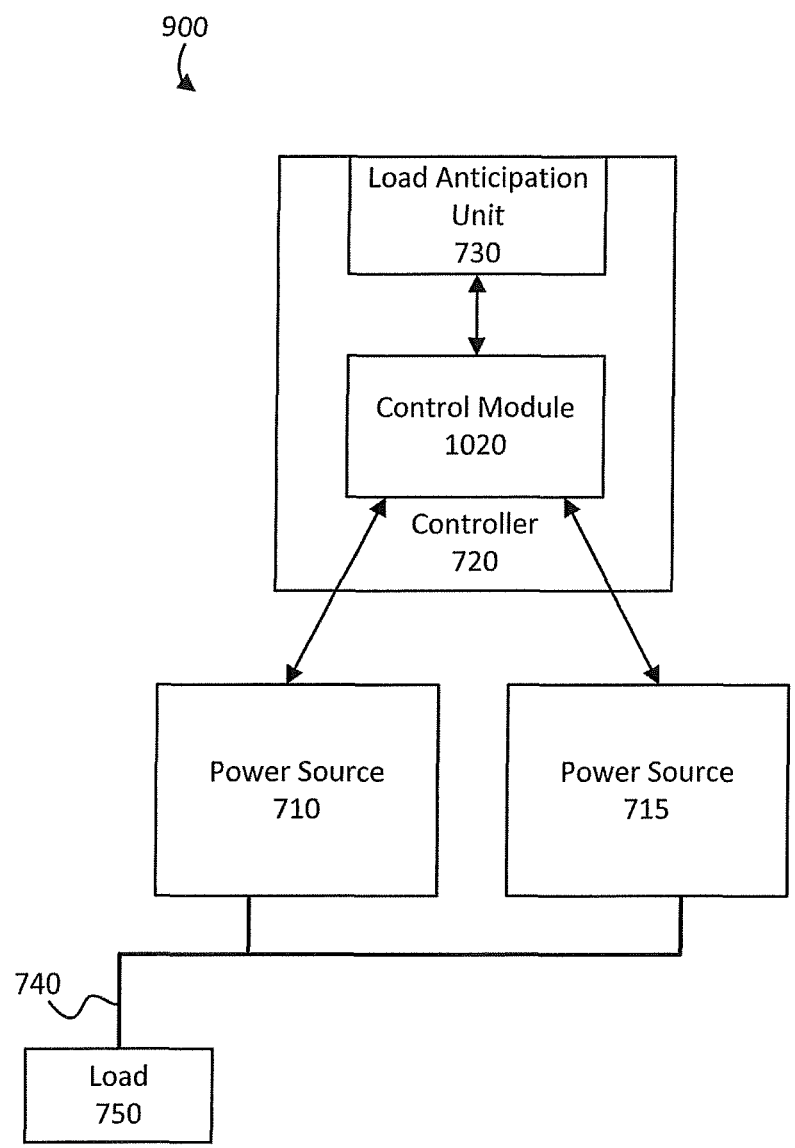
FIG. 9 is another example power system.

FIG. 9 shows an example power system 900. The power system 900 may be similar to the power system 800, except that the power system 900 may not include a separate interface 810 for communicating with a load anticipation unit 730. In the power system 900, the load anticipation unit 730 may be a part of the controller 720. For example, the load anticipation unit 730 may be or include a user input device such as a button or switch that is physically mounted with the controller 720. The load anticipation unit 730 may communicate anticipated load increase information with the control module 820 of the controller 720. The load anticipation unit 730 may send information to the control module 820, or the control module 820 may monitor the load anticipation unit 730. Other variations are possible.

FIGS. 7, 8, and 9 each illustrate power systems 700, 800, and 900 having one controller 720 that both communicates with a load anticipation unit 730 and controls multiple power sources 710 and 715. However, a power system may have any number of controllers, any of which may (or may not) communicate with a load anticipation unit 730 and/or control one or more power sources 710 and 715.

Figure 10:
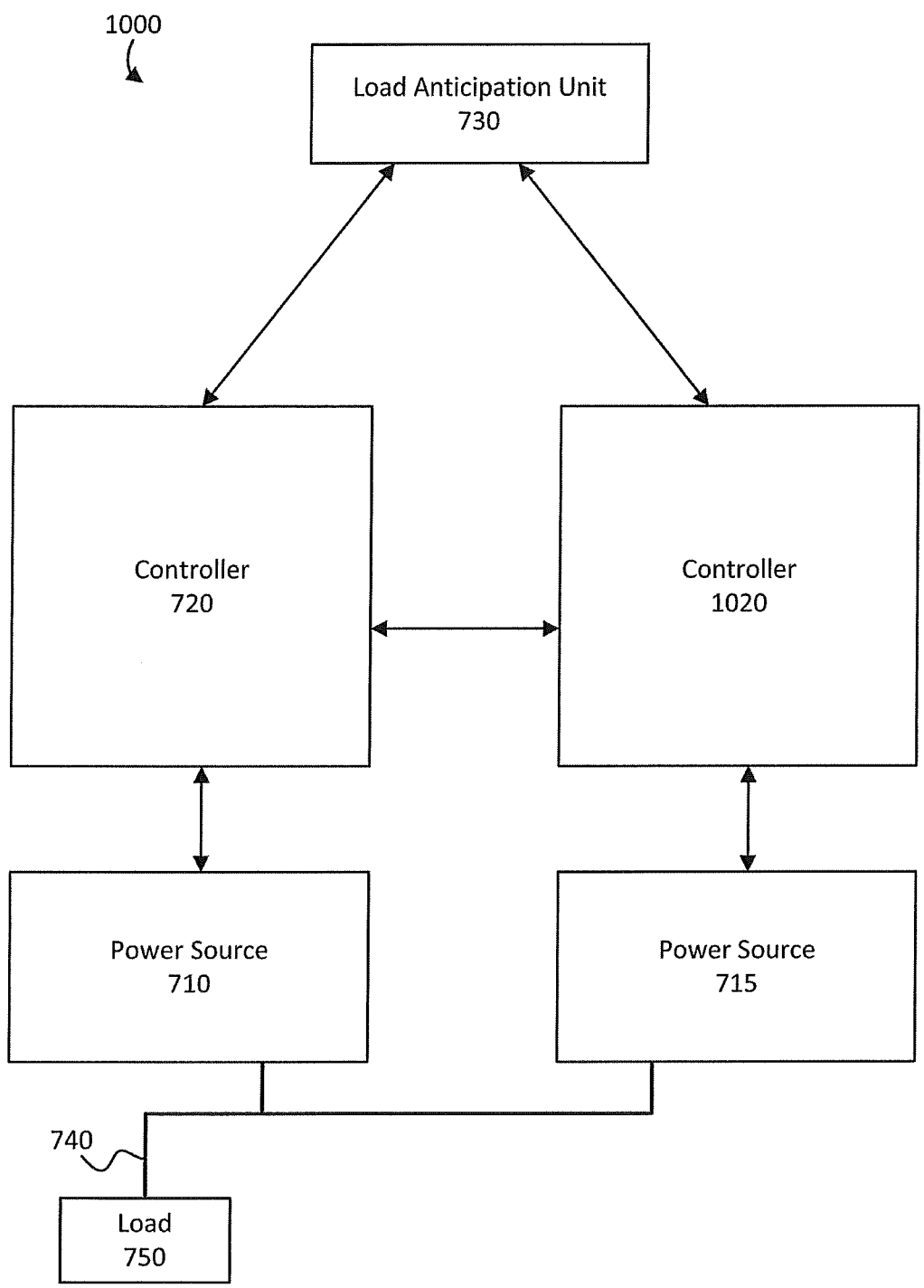
FIG. 10 is another example power system.

FIG. 10 shows an example power system 1000 that includes two controllers 720 and 1020. The power system 1000 may be similar to the power system 700, and may include a load anticipation unit 730 and one or more power sources 710 and 715 connected with a bus 740, which in turn connects with a load 750.

Each of the controllers 720 and 1020 may be connected to or communicate with the load anticipation unit 730. As such, each of the controllers 720 and 1020 may independently receive information from the load anticipation unit 730 regarding an anticipated load increase (such as via status messages, alerts, or parameters/user input information). The controllers 720 and 1020 may each control one or more power sources 710 and 715 based on the information received from the load anticipation unit 730. For example, the controllers 720 and 1020 may start up one or both of the power sources 710 and 715 if the generators 710 and 715 were not already operating when an anticipated load increase is identified from information provided by the load anticipation unit 730. The started power sources 710 and 715 may be operated in various ways, such as in an online mode with a lower load demand, or in an online mode without fuel, or in an offline mode until the load 750 actually increases, at which time the started power sources 710 and 715 may be brought online and provide power to the load 750.

The controllers 720 and 1020 may additionally or alternatively communicate with each other. In doing so, one or both of the controllers 720 and 1020 may use the information from the load anticipation unit 730 to control the operating state of the power system 1000. The controllers 720 and 1020 may control the power sources 710 and 715 in accordance with the operating state of the power system 1000.

As an example, the controllers 720 and 1020 may communicate with each other to determine a common strategy and operating state for the power system 1000. Where no anticipated load increase is identified by either controller 720 or 1020, the controllers 720 and 1020 may control the power sources 710 and 715 in a power supply mode or an inactive mode, as necessary given the load 750, and may control the power system 700 in a standard state. When one of the controllers 720 or 1020 receives information from the load anticipation unit 730, the receiving controller 720 or 1020 may communicate with the other controller. The two controllers 720 and 1020 may, in some instances, confirm with each other that they have both received the same information. The two controllers may jointly control the operating state for the power system 1000, and control the power sources 710 and 715 accordingly. For example, one or both of the controllers 720 and 1010 may change the mode of operation of the power sources 710 and 715 to an offline mode if either power source 710 or 715 was in an inactive mode and has been determined necessary for operation of the power system 1000 in an anticipation state. Other variations are possible.

Figure 11:
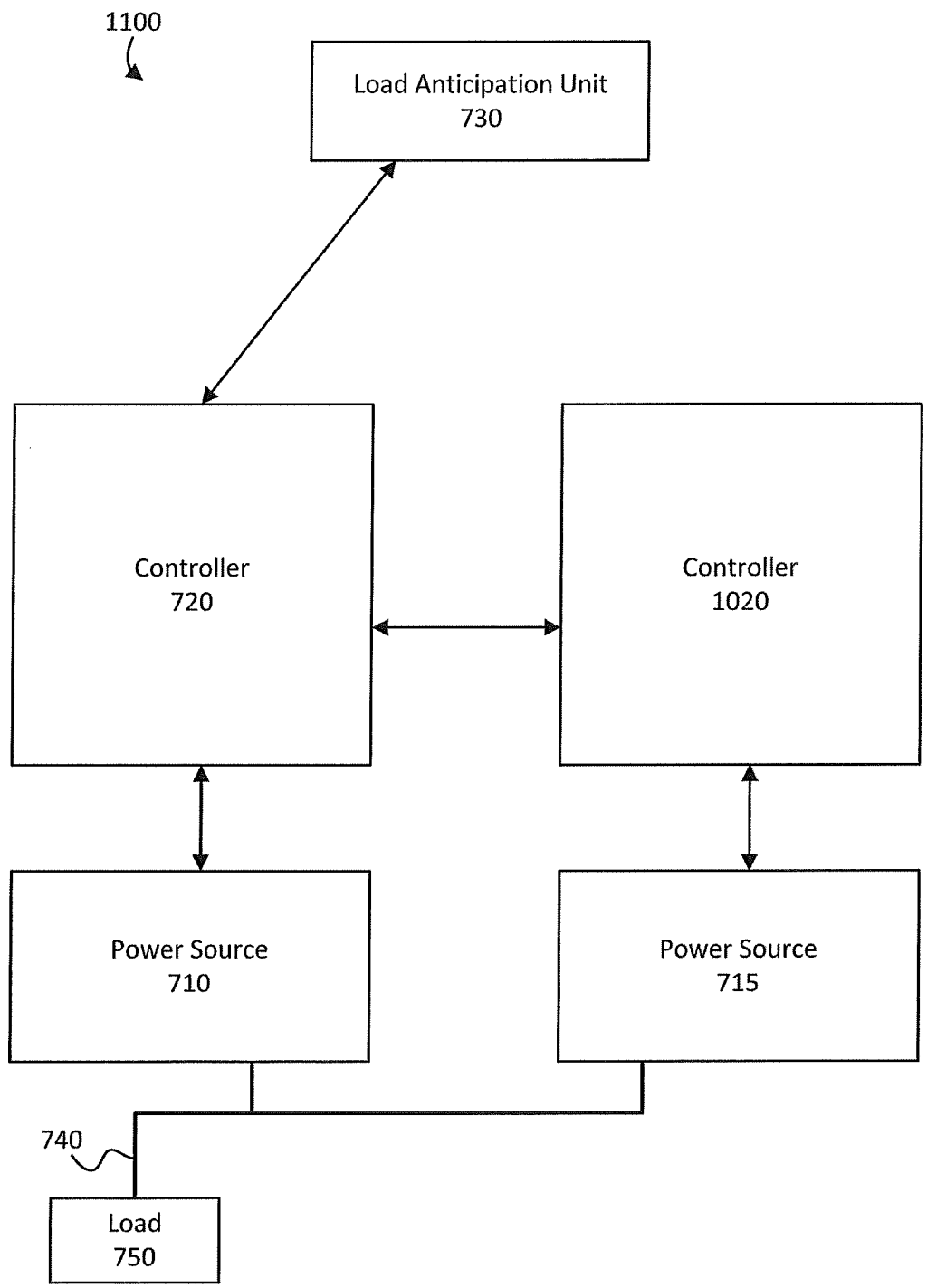
FIG. 11 is another example power system.

FIG. 11 shows another example power system 1100. The power system 1100 may be similar to the power systems 700, 800, 900, and 1000, and may include the same or similar components as the power generation system 1000.

The power system 1100 may differ from the power system 1000 in that one controller 720 (or less than all controllers) may receive information about an anticipated load increase from the load anticipation unit 730. The controller 720 receiving the information may communicate the information to other controllers 1020. The controllers 720 and 1020 may control the power system 1100 and the power sources 710 and 715 in the same or a similar manner as in the power systems 700, 800, 900, or 1000.

Various power systems may include any number of load anticipation units 730, any number of power sources 710 and 715, and any number of controllers 720 and 1020 any of which may communicate with each other and/or the load anticipation units 730, and each of which may control one or more of the power sources 710 and 715 and/or the power system operating state.

In some systems, one controller 720 or 1020 may be a master controller or may make a determination for the power system and all other controllers 720 and 1020 about the operational state of the power system based on anticipated load increase information. In some of these systems, the one controller 720 or 1020 may be designated, such as by a user, by default, or according to one or more algorithms. In other systems, the one controller 720 or 1020 may be the first controller to determine a change in the power system state of operation is necessary. For example, the master controller 720 or 1020 may be the first controller 720 or 1020 to receive an alert from a load anticipation unit 730 of an anticipated load increase. In systems such as the power system 1100, the master controller in these circumstances may always be the controller 720 in communication with the load anticipation unit 730. Many other variations are possible.

Figure 12:
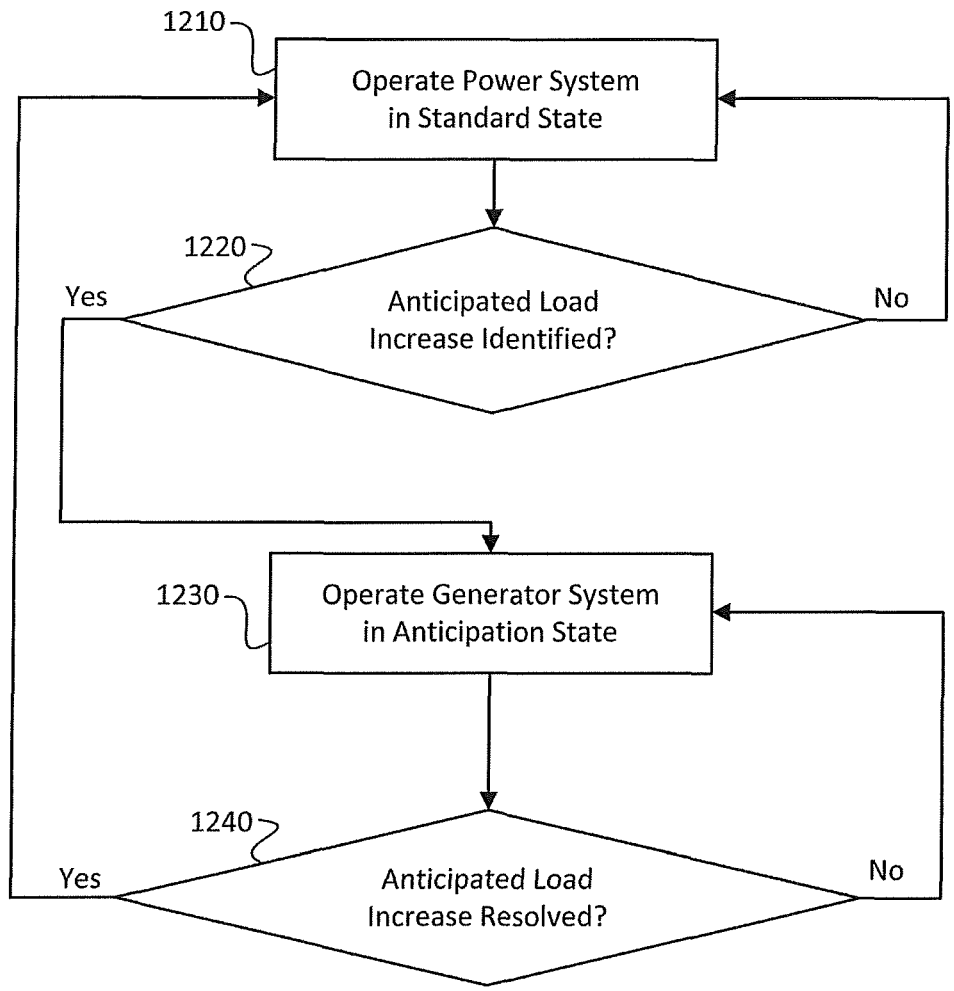
FIG. 12 is an example method for controlling an operation of a power system.

FIG. 12 shows an example method to control an operation of a power system, such as power system 700 (or power systems 800, 900, 1000, or 1100). The method may be performed by one or more controller 720 or various other components of the power system 700. The method may, for example, be implemented as logic which the controller 720 may execute.

The power system 700 may operate in the standard state (1210). In the standard state, the power sources 715 and 720 of the power system may generally either operate in a power supply mode supplying power to the load 750, or may be in an inactive mode.

The power system 700 may determine whether or not an anticipated load increase has been detected or identified (1220). An anticipated load increase may be identified in various ways, such as through the receipt of a load increase anticipation signal or alert from a load anticipation unit 730 or as a result of calculations performed by the controller 720 using parameters from a load anticipation unit 730.

When no anticipated load increase is identified, the power system 700 continues to operate in the standard state (1210). However, when an anticipated load increase is identified, the power system 700 changes its operating state from the standard state to an anticipation state (1230).

In the anticipation state (1230), one or more power sources 710 and 715 that were inactive in the standard state (1210) are started and run (such as in an offline mode, in an online mode with a lower load demand, or in an online mode without fuel).

The power system 700 may operate in the anticipation state (1230) until the power system 700 determines that the anticipated load increase has been resolved (1240). As long as the anticipated load increase has not been resolved, the power system 700 may remain in the anticipation state (1230) and continue to monitor the resolution of the anticipated load increase. When the anticipated load increase has been resolved, the power system 700 may revert to the standard state of operation (1210).

The anticipated load increase may be resolved (1240) in various ways. For example, the anticipated load increase may actually occur. If the load does increase as anticipated, one or more of the power sources 710 and 715 that had been operating in the offline mode may be adjusted to operate in the power supply mode to meet the increased load demand. At that point, the power system 700 may revert to operation in the standard mode (1210). As another example, the power system 700 may include a clock or timer that measure a time from the identification of an anticipated load increase. After a certain predetermined time has expired without experiencing the anticipated load increase, the system may disregard the identified anticipated load increase and revert to operation in the standard state. As yet another example, one or more parameters of the power system 700 may have changed, indicating that the load is no longer anticipated to increase. For example, a change in a location identifier for the power system 700 used to determine an anticipated load increase may indicate that no load increase is anticipated. As still another example of a resolution of an anticipated load increase, a user interface may provide a manual override or disregard input that, when activated by a user, may cancel or ignore the anticipated load increase identification. Many other examples of resolution of the anticipated load increase are possible.

Figure 13:
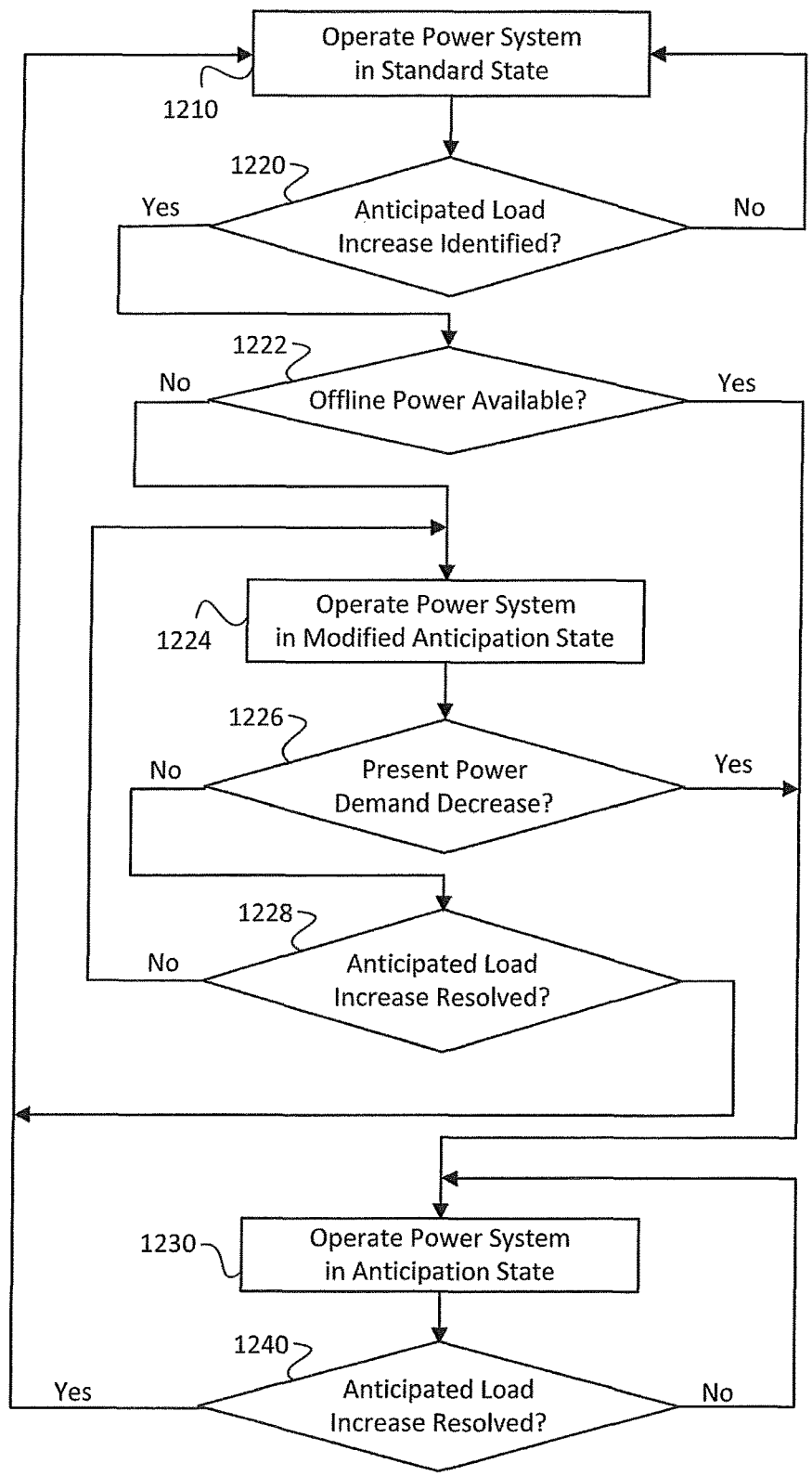
FIG. 13 is an example method for controlling an operation of a power system.

FIG. 13 shows an example method to control an operation of a power system, such as power system 700 (or power systems 800, 900, 1000, or 1100). The method may be performed by one or more controller 720 or various other components of the power system 700. The method may, for example, be implemented as logic which the controller 720 may execute.

The method of FIG. 13 may be similar to the method of FIG. 12. The method of FIG. 13 may additionally account for the circumstance where all power sources 710 and 715 of the power system 700 are operating in a power supply mode when an anticipated load increase is identified.

The power system 700 may operate in the standard state (1210), and determine whether or not an anticipated load increase has been detected or identified (1220), as in FIG. 12.

However, when an anticipated load increase has been identified, the power system 700 may determine whether additional power is not connected with the bus 740 and/or available offline (1222). For example, the power system 700 may determine if there are one or more power sources 710 and 715 that are in an inactive mode and not running.

If additional power is available offline, the power system 700 may operate in the anticipation state (1230), and may monitor for a resolution of the anticipated load increase (1240), as in FIG. 12.

If no additional power is available offline, such as when all power sources 710 and 715 are operating in a power supply mode, the power system 700 may operate in a modified anticipation state (1224). In this state, the power system 700 may continue to operate the active power sources 710 and 715 in power supply modes and supply power to the load 750.

When operating in the modified anticipation state, the power system 700 may monitor and/or identify when the present power demand decreases (1226). When the present power demand decreased, such as when a power source 710 or 715 are no longer needed to provide power to the load 750, the power system 700 may switch operation to the anticipation state (1230) and proceed accordingly.

If the present power demand has not decreased, the power system 700 may also determine whether or not the anticipated load increase has been resolved (1228). For example, the anticipated load increase may be resolved when a timer has expired without experiencing an increase in the load, when one or more parameters of the power system 700 may have changed, indicating that the load is no longer anticipated to increase, when a user input is received instructing the system to cancel or ignore the anticipated load increase identification. Various other examples are possible.

If the anticipated load increase has been resolved, the system may revert to operation in the standard state (1210). If the anticipated load increase has not been resolved, the system may continue to operate in the modified anticipation state (1224).

The method of FIGS. 12 and 13 may include fewer or more blocks. Additionally or alternatively, one or more blocks of FIGS. 12 and 13 may be performed in a different order or simultaneously. As an example, the power system 700 may monitor the present power demands (1226) and resolution of the anticipated load increase (1228) simultaneously or in a different order. Other variations are possible.

Figure 14:
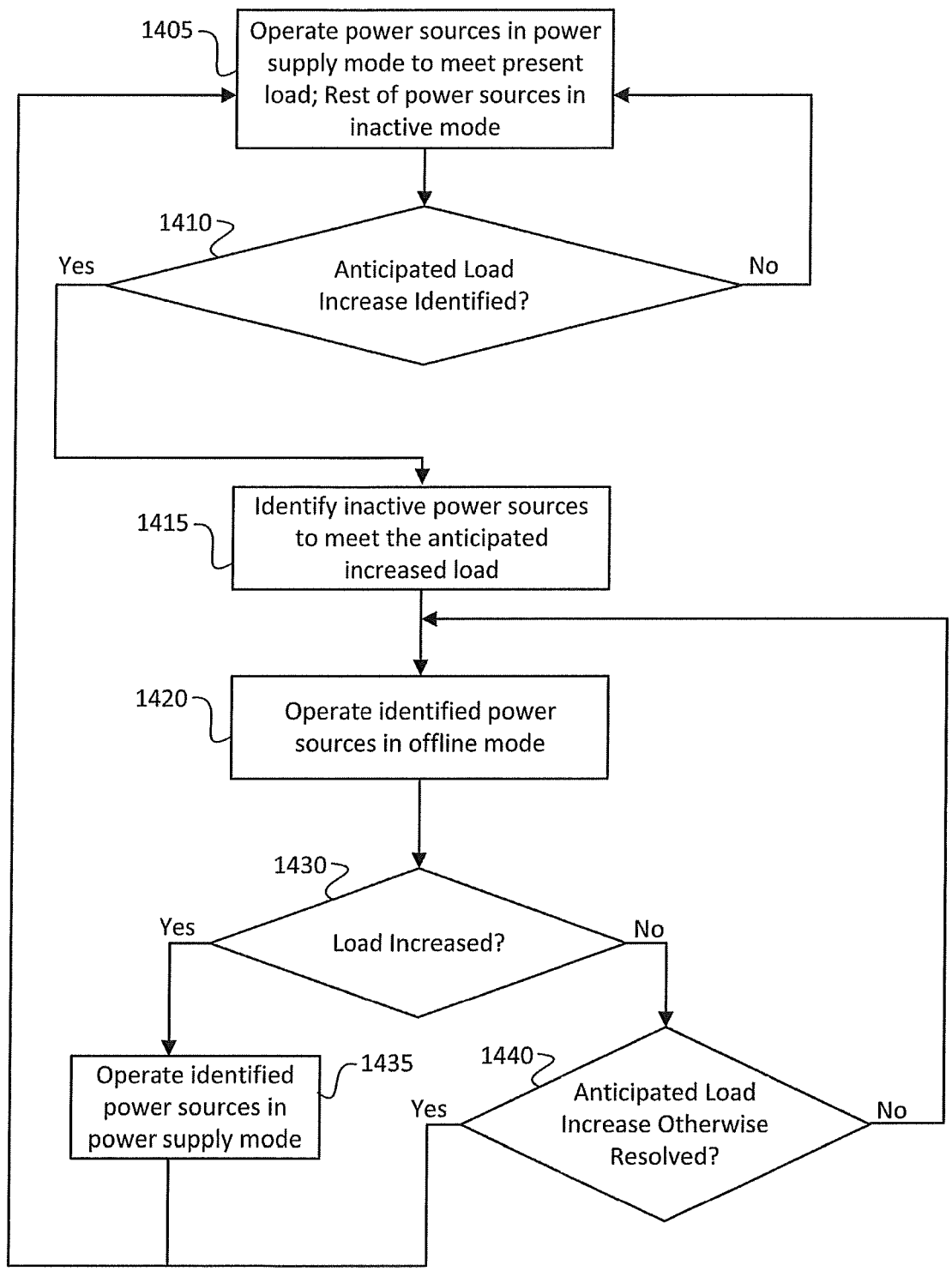
FIG. 14 is an example method for controlling an operation of a power system.

FIG. 14 shows an example method to control an operation of power sources, such as power sources 710 and 715, in a power system 700. The method may be performed by one or more controller 720 or various other components of, or connected with, the power sources 710 and 715. The method may, for example, be implemented as logic which the controller 720 (or multiple controllers 720) may execute.

One or more of the power sources 710 and 715 may be operating in a power supply mode to supply power to meet the present load demands, and the remaining power sources 710 and 715 (if any) may be in an inactive mode (1405). The controller 720 may determine when an anticipated load increase is identified (1410). If not anticipated load increase is identified, the power sources 710 and 715 may continue to operate in the power supply mode or inactive mode as discussed (1405).

If an anticipated load increase is identified, one or more of the power sources 710 and 715 in the inactive mode may be identified to meet the anticipated load increase (1415). The controller 720 may identify the power sources 710 and 715 to meet the anticipated load increase in various ways and based on any number of factors, including using a predetermined or algorithmically selected order of operation, and/or based on various system parameters such as fuel efficiency.

The controller 720 may then control or operate the identified power sources 710 and 715 in offline mode (1420). The controller 720 may monitor the actual load demand to determine when the load increases (1430). When the load increases, the controller 720 controls or operates the identified power sources 710 and 715 to change operation from the offline mode to the power supply mode (1435). At this point, the method returns to block 1405.

If the controller 720 does not detect a load increase, the controller 720 may also determine whether or not the anticipated load increase was resolved in a different manner, such as by the expiration of a timer, a change in anticipating parameters, or a user input canceling the anticipation (1440). If the anticipated load increase is otherwise resolved, the power sources resume their operation and the method returns to block 1405. If instead the anticipated load increase remains unresolved, the identified power sources 710 and 715 continue to operate in the offline mode (1420) and the controller 720 continues to monitor the load (1430) and resolution of the anticipated load increase (1440).

While the method of FIG. 14 refers to operating identified power sources in an offline mode (1420), it should be appreciated that the identified power sources 710 and 715 may alternatively be operated in an online mode with a lower load demand, or in an online mode without fuel, as discussed herein.

The method of FIG. 14 may include fewer or more blocks. Additionally or alternatively, one or more blocks of FIG. 14 may be performed in a different order or simultaneously. As an example, the monitoring in blocks 1430 and 1440 may be performed simultaneously or in a different order. Other variations are possible.

Figure 15:
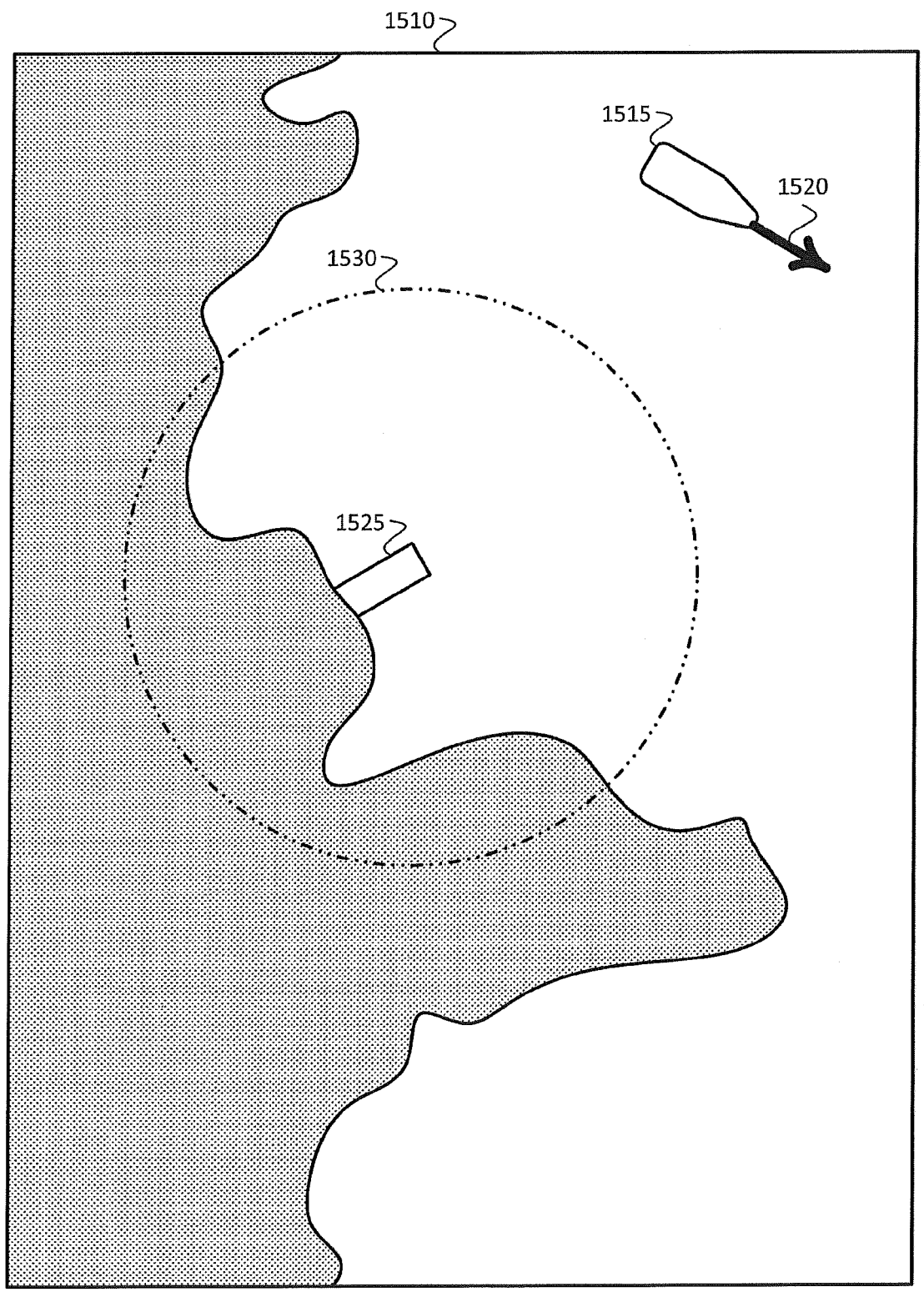
FIG. 15 is an example environment for a power system.
Figure 16:
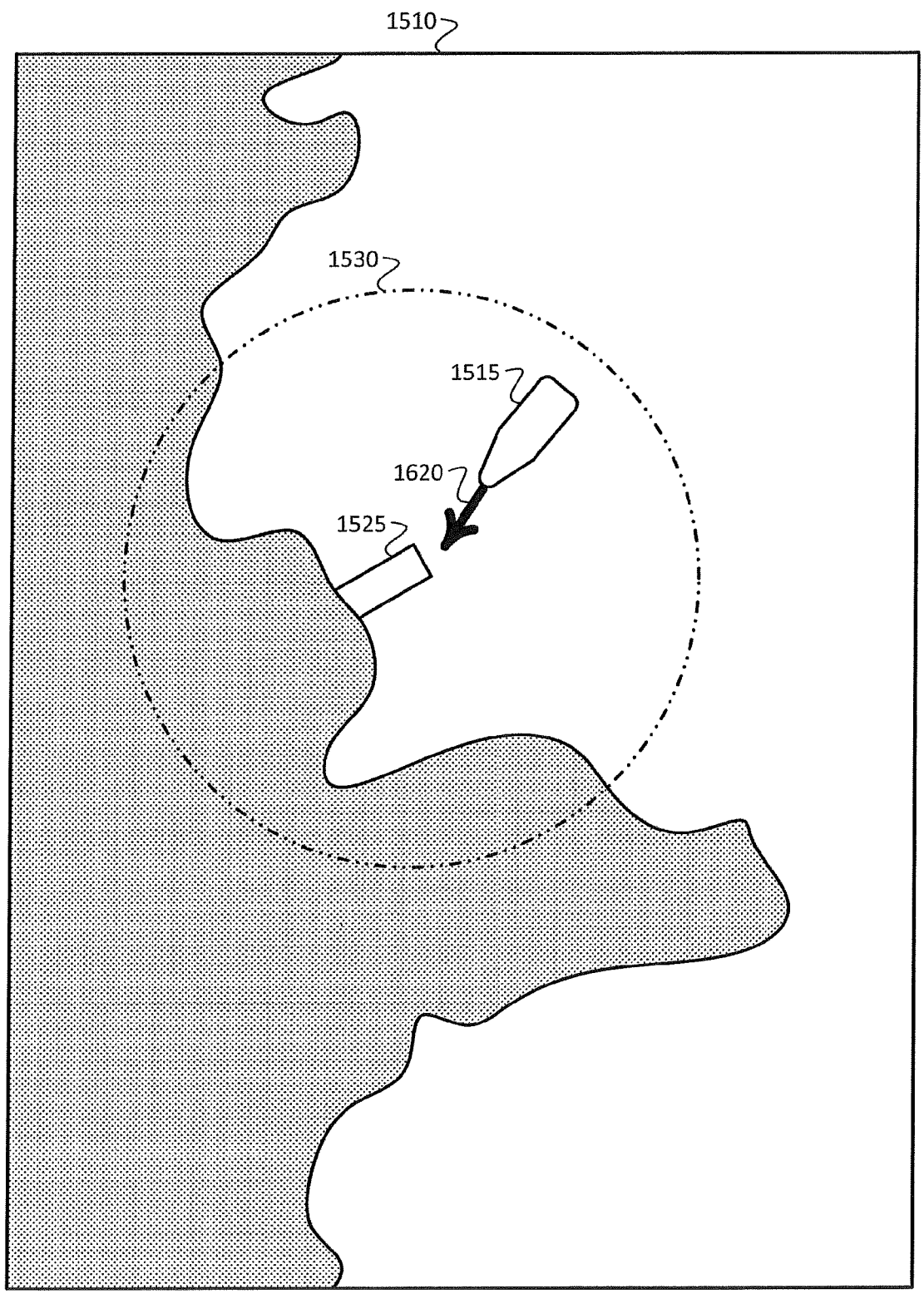
FIG. 16 is an example environment for a power system.
Figure 17:
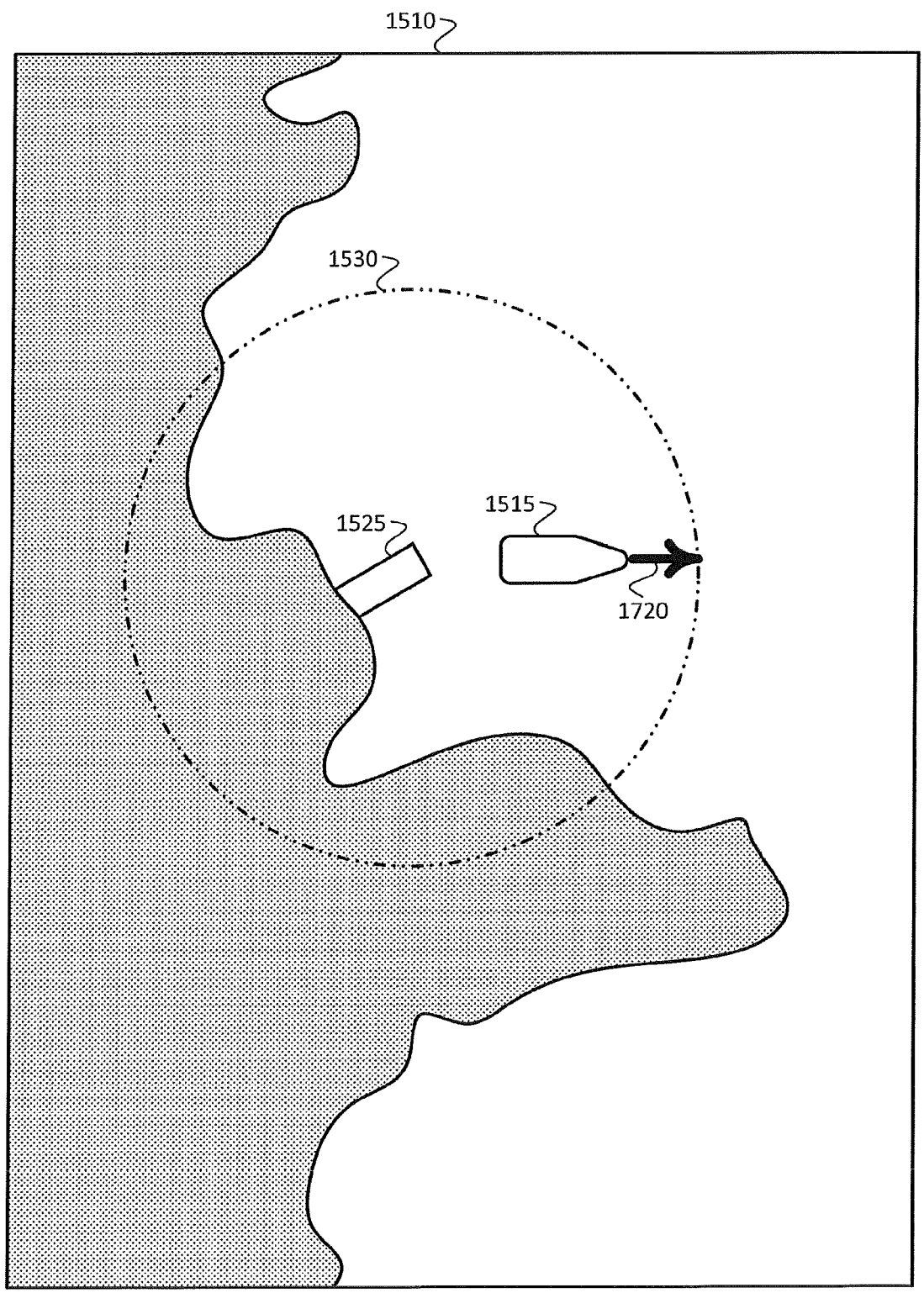
FIG. 17 is an example environment for a power system.

FIGS. 15-17 illustrate an example environment 1510 and system that may incorporate the anticipation systems described herein. A vessel 1515 may include part or all of a power system 700. For example, the vessel 1515 may include one or more power sources, such as power sources 710 and 715. The marine vessel 1515 may include or communicate with one or more load anticipation units 730, such as a location device that tracks a location of the vessel 1515. The location information for the vessel 1515 may be gathered or received by one or more controllers 720, which may control the operation of the power sources 710 and 715. The controllers 720 may be located on the vessel 1515 or remotely.

The vessel 1515 may be traveling in a direction 1520. The controller 720 may determine or identify the direction 1520 in various ways, such as using a compass or by comparing historical location information to determine a direction of travel. The controller 720 may monitor the direction 1520 continuously, periodically, randomly, or when triggered, such as once a vessel 1515 is a certain distance from a point of interest 1525.

The controller 720 may track or monitor one or more points of interest 1525. Points of interest 1525 may be automatically identified and/or located, such as via maps or location information preprogrammed into the controller 720 or accessed from a remote source or through the Internet via a wired or wireless connection. As an example, a controller 720 may access map information from a remote mapping service that may identify and/or locate various marine points of interest 1525, such as ports, docks, dams, or heavily trafficked seaways. Additionally or alternatively, a user may input one or more points of interest 1525, such as destinations or scenic locations.

The controller 720 may additionally or alternatively identify, determine, or track one or more boundaries or thresholds 1530 associated with the points of interest 1525. The threshold 1530 may represent a distance from the point of interest 1525 at which the controller 720 may be programmed to adjust an operating state of the power system 700 and/or operating mode of any of the power sources 700 or 715. While only one threshold 1530 is shown in FIGS. 15-17, in other systems, more than one threshold 1530 may be set based on one point of interest 1525, and each of the thresholds 1530 may be associated with different programmed responses from the controller 720. Many other variations are possible.

The thresholds 1530 may be boundaries that are preprogrammed into the controller 720 or accessed through one or more mapping services. Additionally or alternatively, the thresholds 1530 may be calculated or otherwise determined as a designated distance in one or more direction from a point of interest 1525. In some systems, the thresholds 1530 may generally round or circular, with a radius extending from the point of interest 1525. In other systems, the thresholds 1530 may be any irregular shape or boundary, and may be set or determined in various other ways.

Though the environment 1510 is shown as a marine environment with a vessel 1515 such as a boat or ship, the systems and methods described herein may also apply to various other environments, including land or air based environments.

The controller 720 may adjust an operating state of the power system 700, and/or an operating mode of the power sources 710 and 715, based on points of interest 1525 and/or corresponding thresholds 1530.

Figure 18:
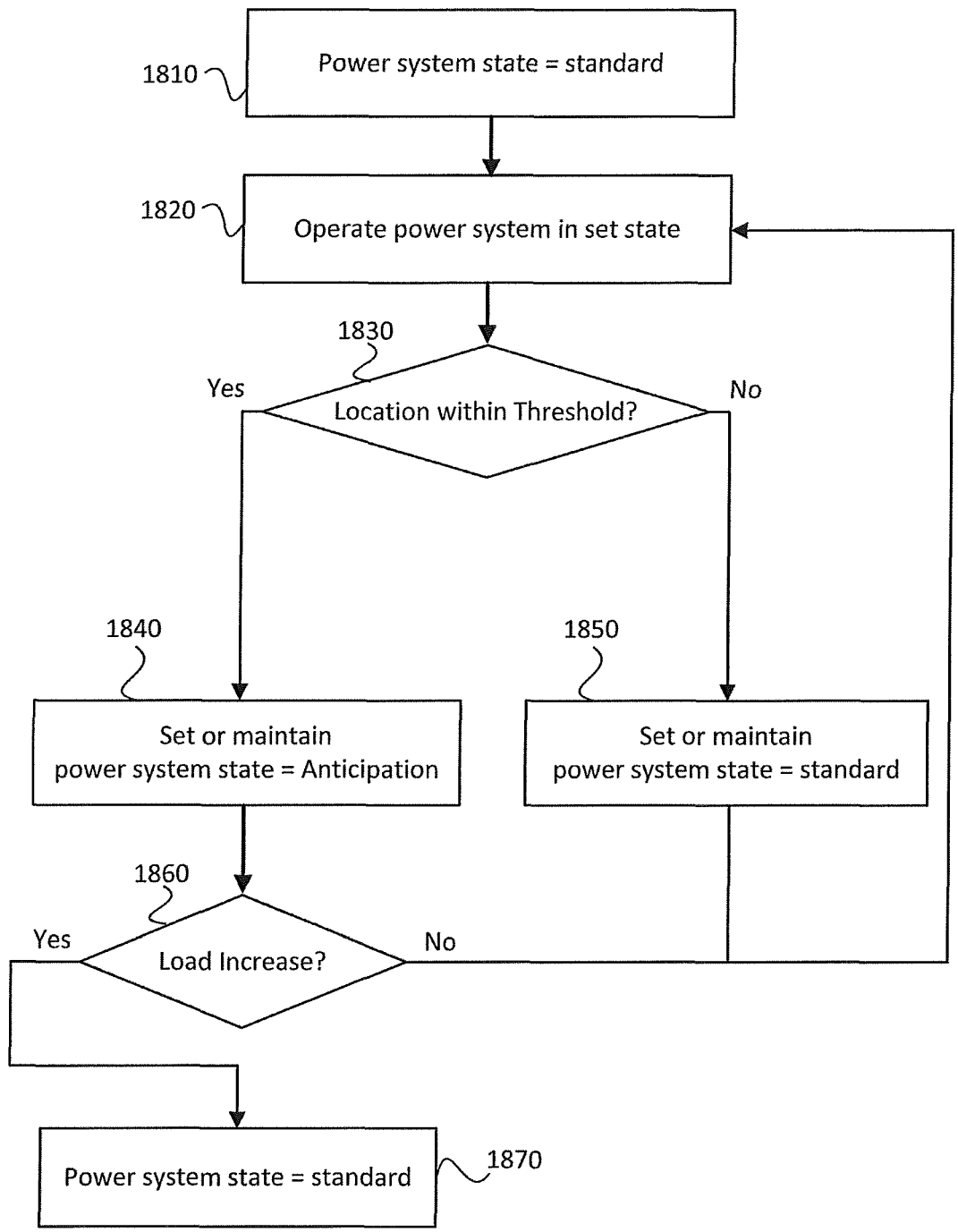
FIG. 18 is an example method for controlling an operation of a power system.

FIG. 18 illustrates an example method that a controller 720 or another device may use to control an operating state of a power system 700 based on points of interest 1525 and/or thresholds 1530. The controller 720 may set the state of the power system 700 as the standard state (1810). The controller 720 may control or operate the power system 700 to run in the standard state (1820). The controller may additionally or alternatively control or operate one or more power sources 710 and 715 to operate in either a power supply mode or an inactive mode.

The controller 720 may identify, monitor, or access or store information for one or more points of interest 1525 and/or corresponding thresholds 1530. The controller 720 may additionally or alternatively monitor a location of the power system 700. For example, the controller 720 may receive location information from a GPS or other device.

The controller 720 may determine whether or not the location of the power system 700 is within a threshold 1530, or within a given distance from the point of interest 1525 (1830). When the location of the power system 700 is not within the threshold 1530, or within the given distance from the point of interest 1525, the controller 720 may maintain the power system state at the standard state (1820) and control the power system 700 accordingly (1850). An example of this is shown in FIG. 15, where the vessel 1515 with the power system 700 is outside of the threshold 1530.

The vessel may pass within the threshold 1530, or within a given distance from the point of interest 1525, as shown in FIGS. 16 and 17. When the controller 720 determines that the vessel 1515 passes within the threshold 1530 (or within a certain distance from the point of interest 1525), the controller 720 may change the power system state from the standard state to the anticipation state (1840). The controller 720 may additionally or alternatively control or operate one or more of the power sources 710 and 715 that have been inactive to run (such as in an offline mode, in an online mode with a lower load demand, or in an online mode without fuel).

Once the power system state has been changed to the anticipation state, the controller 720 may determine whether or not the load has actually increased (1860). When the controller 720 determines that the load has not increased, the controller 720 may continue to operate the power system in the anticipation mode (1820) until either the location of the vessel 1515 is no longer within the threshold 1530 (1830) or until the load increases (1860).

When the controller 720 determines that the load has increased, the controller 720 may run the power sources 710 and 715 previously started and run in (1840) in a power supply mode (and the power sources 710 and 715 may supply power to the increased load) (1870). The controller 720 may additionally or alternatively control the power system 700 to operate in the standard state (1870).

Figure 19:
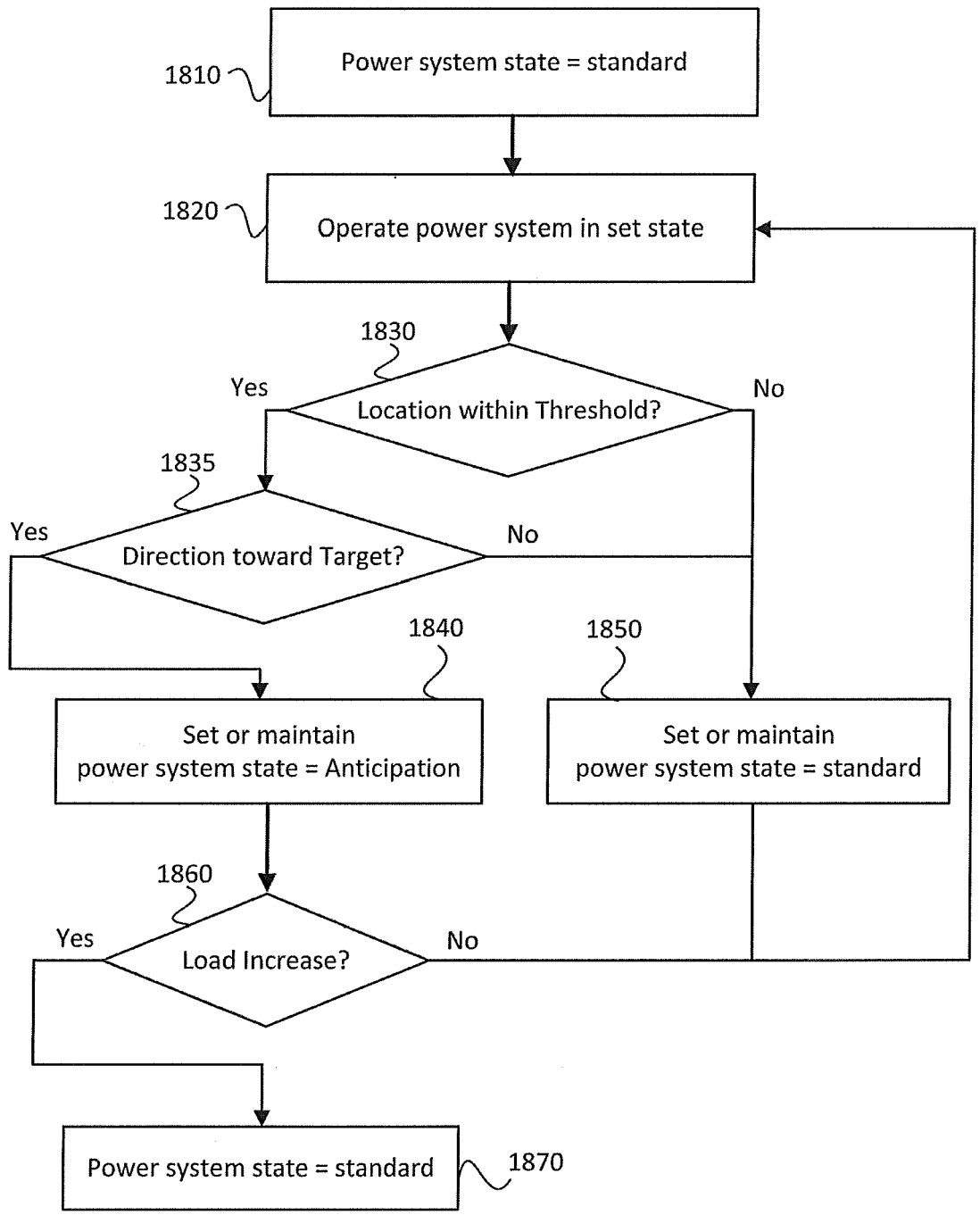
FIG. 19 is an example method for controlling an operation of a power system.

FIG. 19 illustrates another example method that a controller 720 or another device may use to control an operating state of a power system 700 based on points of interest 1525 and/or thresholds 1530. The method of FIG. 19 may be similar to the method of FIG. 18, but may differ in the parameters considered by the controller 720 before changing an operating state of the power system 700.

The controller 720 may monitor the location of the vessel 1515 and compare the location with a threshold 1530 (1830), as in FIG. 18. The controller 720 may additionally monitor a direction 1520 of the vessel 1515. In some systems, the controller 720 may monitor the direction 1520 regularly, while in other systems the controller 720 may only monitor the direction 1520 when the vessel 1515 is near the point of interest 1525 or within the threshold 1530. This may be useful, for example, to distinguish a vessel 1515 traveling toward a point of interest 1525 where additional power may be needed from when a vessel 1515 is traveling tangentially through a threshold 1530 with no intention of approaching the point of interest 1525, or when a vessel 1515 is leaving a point of interest 1525 but is still within the threshold 1530.

Where the vessel 1515 is not within a threshold, the controller 720 may continue to operate the power system 700 in the standard state (1850, 1820). However, when the vessel 1515 is within the threshold 1530, the controller 720 may compare a direction 1520 of the vessel 1515 with a location of the point of interest 1525 to determine if the vessel 1515 is traveling toward the point of interest 1525 (1835).

When the controller 720 determines that the vessel 1515 is heading toward a point of interest 1525 (as shown in FIG. 16), the controller 720 may set the power system in the anticipation state (1840) and proceed as discussed in FIG. 18. Alternatively, when the controller 720 determines that the vessel 1515 is not heading toward the point of interest 1525 (as shown in FIG. 17), the controller 720 may maintain the power system in the standard state (1850) and proceed as discussed in FIG. 18.

The controller 720 may determine if the vessel 1515 is traveling toward the point of interest 1525 in various ways. For example, the controller 720 may compare the direction 1520 with a location of the point of interest 1525. If the point of interest 1525 is within a determined angle or degree (for example, within 20, 45, or 90 degrees) of the direction 1520, the controller 720 may determine that the vessel 1515 is headed toward the point of interest 1525. The angle or degree may be preset or may be determined. As an example, the angle or degree may be set based on a distance from the point of interest, such that a larger angle may be provided for a vessel closer to, or further from, the point of interest 1525. As another example, the angle or degree may depend on a distance from one point of interest 1525 to another nearby point of interest 1525. In other systems, the controller 720 may determine if the direction 1520 is within a determined angle or degree (for example, within 20, 45, or 90 degrees) of the point of interest 1525. Many other variations are possible.

The method of FIGS. 18 and 19 may include fewer or more blocks. For example, the methods may, in some variations, include determinations of whether or not all power sources 710 and 715 are already operating in a power supply mode prior to setting the power system 700 operating state to an anticipation mode, and if so, may set the power system 700 operating state to a modified anticipation mode. In some systems, the methods may additionally or alternatively consider other parameters, such as speed of a vessel, in making a determination about an anticipated load increase. Additionally or alternatively, one or more blocks of FIGS. 18 and 19 may be performed in a different order or simultaneously. As an example, the power system 700 may compare the location of the vessel 1515 with a threshold 1530 (1830) and compare the direction 1520 of the vessel 1515 with the point of interest 1525 simultaneously or in a different order. Other variations are possible.

The terms "anticipate," "anticipation," and "anticipated" as used herein to describe systems and methods for responding to an anticipated load increase may be interchanged or synonymous with "predict," "prediction," and "predicted."

It should also be appreciated that while additional power sources 710 and 715 may be started and run during an anticipation state, there are circumstances where an increased load demand does not require that all previously operating power sources 710 and 715 remain operating in a power supply mode. For example, a power system may include a 30 kW generator operating in a power supply mode and a 200 kW generator that is inactive. An anticipated load increase of 100 kW may be detected by the controller 720, prompting the controller 720 to start and run the 200 kW generator. When the load actually increases, the controller 720 may operate the 200 kW generator in a power supply mode, and may turn off the 30 kW generator, as it may not be needed. Many other variations are possible.

The methods, devices, and logic described above may be implemented in many different ways in many different combinations of hardware, software or both hardware and software. For example, all or parts of the power system 700 or power sources 710 and 715, such as one or more controllers 720, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

The methods described may include determinations in relation to one or more thresholds. While these methods may refer to a determination about whether a parameter exceeds a threshold, the determination may in other variations be whether the parameter is greater than or equal to, less than, equal to, or less than or equal to a threshold. Other variations are possible.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising:
   detecting an anticipated load increase;
   changing a power source from inactive to operation in an offline mode upon detection of the anticipated load increase;
   monitoring a load to identify a load increase associated with the anticipated load increase; and changing operation of a power system from the offline mode to a power supply mode upon identification of the load increase associated with the anticipated load increase.

2. The method of claim 1, wherein detecting the anticipated load increase comprises receiving a signal from a global positioning system.

3. The method of claim 1, wherein detecting the anticipated load increase comprises receiving an anticipated load increase indication from a joystick, toggle switch, or button.

4. The method of claim 1, wherein the anticipated load increase is detected based on a location of the power system.

5. The method of claim 1, wherein the power source comprises an engine and an alternator connected with the engine and configured to generate power;
wherein the engine is not running when the power source is inactive;
wherein the engine is running and no power is supplied from the alternator to the load when the power source is operating in the offline mode; and
wherein the engine is running and power is supplied from the alternator to the load when the power source is operating in the power supply mode.

6. A system comprising:
an input configured to receive an anticipated load increase indication;
a controller in communication with the input and a power system comprising a first power source and a second power source, the controller comprising:
a non-transitory computer readable storage medium storing logic for controlling a power system, the logic comprising:
instructions for identifying an anticipated load increase;
instructions for operating the power system in a first state prior to identification of the anticipated load increase, the first power source operating in a power supply mode and the second power source being inactive when the power system is operated in the first state;
instructions for operating the power system in a second state upon identification of an anticipated load increase, the first power source operating in the power supply mode and the second power source operating in an offline mode when the power system is operated in the second state; and
a processor configured to execute the logic.

7. The system of claim 6, wherein the system comprises a plurality of power sources.

8. The system of claim 7, wherein the instructions for operating the power system in the first state comprise instructions for controlling each of the plurality of power sources to either be inactive or to operate in a power supply mode.

9. The system of claim 7, wherein the instructions for operating the power system in the second state comprise instructions for controlling each of the plurality of power sources to either operate in a power supply mode or an offline mode.

10. The system of claim 9, further comprising instructions for identifying a load increase when the power system operates in the second state.

11. The system of claim 10, wherein the logic further comprises instructions to control the power sources operating in the offline mode in the second state to operate in the power supply mode upon identification of the load increase.

12. The system of claim 9, wherein the power sources operating in the power supply mode are operating and are supplying power to a load connected with the power system;
wherein the power sources operating in the offline mode are operating and are not supplying power to the load; and
wherein the inactive power sources are not operating.

13. The system of claim 6, wherein the logic further comprises instructions for monitoring a load powered by the power system.

14. The system of claim 6, wherein the power system comprises a plurality of power sources;
wherein the instructions for operating the power system in a first state prior to identification of the anticipated load increase comprise instructions for operating a first set of the power sources in a power supply mode and controlling a second set of power sources to be inactive; and
wherein the instructions for operating the power system in a second state upon identification of an anticipated load increase comprise instructions for operating the first set of the power sources in the power supply mode and operating the second set of power sources in an offline mode.

15. The system of claim 6, wherein operating the first power source in the power supply mode comprises running the first power source and supplying power generated by the first power source to a load; and wherein operating the second power source in the offline mode comprises running the second power source and not supplying power from the second power source to the load.

16. A system comprising:
a power source connected with a vehicle;
a load anticipation unit that detects a parameter associated with the vehicle;
a controller that controls an operation of the power source;
wherein the power source is inactive before an anticipated load increase is identified;
wherein the controller receives the parameter and identifies an anticipated load increase based on the parameter;
wherein the controller controls the power source to operate in an offline mode when the anticipated load increase is identified;
wherein the controller monitors a load to identify a load increase associated with the anticipated load increase; and
wherein the controller controls the power source to change from operating in an offline mode to operating in a power supply mode when the load increase associated with the anticipated load increase is identified.

17. The system of claim 16, wherein the parameter comprises a location of the vehicle.

18. The system of claim 17, wherein the controller compares the location of the vehicle to a threshold associated with a point of interest; and
wherein the controller identifies an anticipated load increase when the location of the vehicle is within the threshold.

19. The system of claim 18, wherein the vehicle is a boat, and wherein the point of interest is a port or dock.

* * * * *